(12) United States Patent
Katano et al.

(10) Patent No.: US 9,638,843 B2
(45) Date of Patent: May 2, 2017

(54) REFLECTOR ARRAY OPTICAL DEVICE AND METHOD FOR MANUFACTURING THE SAME

(71) Applicants: STANLEY ELECTRIC CO., LTD., Meguro-ku, Tokyo (JP); NATIONAL INSTITUTE OF INFORMATION AND COMMUNICATIONS TECHNOLOGY, Koganei-shi, Tokyo (JP)

(72) Inventors: Kunihiko Katano, Tokyo (JP); Takashi Sugiyama, Tokyo (JP); Yuki Kitamura, Tokyo (JP); Satoshi Maekawa, Tokyo (JP)

(73) Assignees: STANLEY ELECTRIC CO., LTD., Tokyo (JP); NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 464 days.

(21) Appl. No.: 14/352,559

(22) PCT Filed: Oct. 16, 2012

(86) PCT No.: PCT/JP2012/076675
§ 371 (c)(1),
(2) Date: Apr. 17, 2014

(87) PCT Pub. No.: WO2013/058230
PCT Pub. Date: Apr. 25, 2013

(65) Prior Publication Data
US 2014/0268338 A1    Sep. 18, 2014

(30) Foreign Application Priority Data

Oct. 17, 2011 (JP) .................................. 2011-227768
Mar. 23, 2012 (JP) .................................. 2012-066494

(51) Int. Cl.
G02B 5/136 (2006.01)
G02B 5/124 (2006.01)
(Continued)

(52) U.S. Cl.
CPC ............. *G02B 5/136* (2013.01); *G02B 5/124* (2013.01); *G02B 27/2292* (2013.01); *G02B 17/002* (2013.01); *G02B 17/06* (2013.01)

(58) Field of Classification Search
CPC .......... G02B 5/124; G02B 5/12; G02B 5/126; G02B 5/128; G02B 5/045; G02B 3/08;
(Continued)

(56) References Cited

U.S. PATENT DOCUMENTS 5,171,624 A * 12/1992 Walter ................... G02B 5/124
                                                                 359/530
5,614,286 A * 3/1997 Bacon, Jr. ............. B29C 39/148
                                                                 359/530
(Continued)

FOREIGN PATENT DOCUMENTS

CN     101221264 A    7/2008
CN     101641630 A    2/2010
(Continued)

OTHER PUBLICATIONS

Translation of JP 2011191404 A.*
(Continued)

*Primary Examiner* — Scott J Sugarman
*Assistant Examiner* — Sharrief Broome
(74) *Attorney, Agent, or Firm* — Holtz, Holtz & Volek PC

(57) ABSTRACT

A reflector array optical device has a plurality of dihedral corner reflector array optical elements which are disposed side by side on the same plane. Each of the dihedral corner reflector array optical elements has a substrate and a plurality of dihedral corner reflectors which each have at least
(Continued)

two orthogonal side faces perpendicular to the principal surface of the substrate and orthogonal to each other, and which are formed on the substrate so that the orientations of the interior angles of the orthogonal side faces are aligned with each other.

9 Claims, 18 Drawing Sheets

(51) Int. Cl.
 *G02B 27/22* (2006.01)
 *G02B 17/06* (2006.01)
 *G02B 17/00* (2006.01)
(58) Field of Classification Search
 CPC ........ G02B 5/08; G02B 5/136; G02B 6/0096; G02B 6/0036; G02B 6/0038; G02B 6/0055; G02B 17/006; G02B 19/0028; G02B 19/0042; G02B 19/0061; G02B 1/02; G09F 13/16; G09F 2013/0472; G09F 13/14; G09F 19/12; G09F 13/02; G09F 13/00; G09F 19/14; G09F 2013/0422; G09F 2013/145; G09F 3/18; G09F 7/00
 See application file for complete search history.

(56) References Cited

U.S. PATENT DOCUMENTS

| | | | |
|---|---|---|---|
| 5,632,946 A | 5/1997 | Bacon et al. | |
| 6,322,652 B1 | 11/2001 | Paulson et al. | |
| 8,057,043 B2 | 11/2011 | Maekawa | |
| 2009/0295755 A1 | 12/2009 | Chapman et al. | |
| 2010/0073751 A1* | 3/2010 | Maekawa | G02B 5/124 359/203.1 |
| 2010/0231860 A1 | 9/2010 | Maekawa | |

FOREIGN PATENT DOCUMENTS

| | | | |
|---|---|---|---|
| JP | 02044702 A | | 2/1990 |
| JP | 2-44702 U | | 3/1990 |
| JP | 9-504624 A | | 5/1997 |
| JP | 09504624 A | | 5/1997 |
| JP | 11-036061 A | | 2/1999 |
| JP | 11036061 A | | 2/1999 |
| JP | 2004-325663 A | | 11/2004 |
| JP | 2004325663 A | | 11/2004 |
| JP | 2005-181555 A | | 7/2005 |
| JP | 2005181555 A | | 7/2005 |
| JP | 2011-191404 A | | 9/2011 |
| JP | 2011191404 A | * | 9/2011 |
| WO | 9511468 A1 | | 4/1995 |
| WO | 2007116639 A1 | | 10/2007 |
| WO | WO 2007/116639 A1 | | 10/2007 |

OTHER PUBLICATIONS

Japanese Office Action (and English translation thereof) dated Oct. 13, 2015, issued in counterpart Japanese Application No. 2011-227768.

Chinese Office Action (and English translation thereof) dated Sep. 2, 2015, issued in counterpart Chinese Application No. 201280062399.5.

Japanese Office Action (and English translation thereof) dated Mar. 15, 2016, issued in counterpart Japanese Application No. 2012-066494.

International Search Report (ISR) dated Jan. 29, 2013 (and English translation thereof) issued in International Application No. PCT/JP2012/076675.

Extended European Search Report dated Jun. 22, 2015, issued in counterpart European Application No. 12841642.7.

\* cited by examiner

REFLECTOR ARRAY OPTICAL DEVICE AND METHOD FOR MANUFACTURING THE SAME

TECHNICAL FIELD

The present invention relates to an optical device for allowing a real image (real mirror image) of an object being observed to be formed in a space toward an observer, and a method for manufacturing the same.

BACKGROUND ART

A display device has been suggested which allows a real image (real mirror image) of an object being observed to be formed in the air so that an observer can view the image (see Patent Literature 1).

Such a display device includes a real mirror image forming optical system for allowing a real image (real mirror image) of an object being observed to be formed in a space toward an observer, and the object to be observed for which the real image (real mirror image) is formed and which is disposed in a space opposite to the space toward the observer of the real mirror image forming optical system. Such a real mirror image forming optical system allows a real image (real mirror image) of the object being observed to be formed at a symmetric position with respect to the symmetric surface of the real mirror image forming optical system.

Patent Literature 1 has suggested, as a real mirror image forming optical system or an optical element, a planar assembly of a plurality of unit optical elements (each being referred to as a dihedral corner reflector) that are each made up of two minute mirror surfaces (reflective surfaces) that are orthogonal to each other. Disclosed in Patent Literature 1 is a dihedral corner reflector array optical element in which a plurality of dihedral corner reflectors are disposed in an array on one plane, that is, aligned in a grid pattern. Some dihedral corner reflector array optical elements employ a dihedral corner reflector that utilizes, as a mirror surface, the inner wall of an optical through-hole that assumes a direction in which the through-hole penetrates the element plane; or a dihedral corner reflector that utilizes, as a mirror surface, a transparent cylindrical inner wall that is protruded from a surface of a substrate made of a transparent material (see Patent Literature 2). Note that since the transparent cylindrical body is a prism, such as one having a prismatic shape, in which an optical hole is cylindrically projected and a translucent material is filled therein, the transparent cylindrical body will be hereinafter referred simply to as the projection.

The dihedral corner reflector array optical element is configured such that each mirror surface of each of a plurality of aligned dihedral corner reflectors is erected to be generally perpendicular to the element plane. Thus, a light beam from an object being observed that is disposed toward one side of the element plane is reflected twice on the dihedral corner reflector when passing through the element plane, and the light beam is bent to pass through the element plane so as to be formed as a real image in a space toward the opposite side of the element plane and in which the object being observed is not present. That is, the dihedral corner reflector array optical element is capable of forming the real image of the object being observed as if the object being observed is present at a symmetric position with respect to the element plane (also referred to as a symmetry plane) of the dihedral corner reflector array optical element.

CITATION LIST

Patent Literature

Patent Literature 1: International Publication No. 2007-116639
Patent Literature 2: Japanese Patent Application Laid-Open No. 2011-191404

SUMMARY OF INVENTION

Technical Problem

The dihedral corner reflector array optical element disclosed in Patent Literature 1 has the inner wall of an optical through-hole as a mirror surface and is manufactured by electroforming. On the other hand, the dihedral corner reflector array optical element disclosed in Patent Literature 2 employs the inner wall of projections as a mirror surface and is manufactured by producing molds and by resin molding with the use of the molds. Since either manufacturing method requires processing with accuracy, it is very difficult to manufacture a dihedral corner reflector array optical element having a large area, and thus the size of the plate-shaped optical element that can be manufactured is limited to a size of 10 cm square at best.

In this context, it is an object of the present invention to provide a reflector array optical device or a large real mirror image forming optical system using a dihedral corner reflector array optical element, and a method for manufacturing the same.

Solution to Problem

A reflector array optical device according to the present invention which allows a real image of an object being observed that is disposed toward one side of a principal plane to be formed in a space toward the other side of the principal plane has a plurality of dihedral corner reflector array optical elements that are disposed side by side on the same plane. Each of the plurality of dihedral corner reflector array optical elements is made up of a substrate; and a plurality of dihedral corner reflectors which each have at least two orthogonal side faces, the orthogonal side faces being perpendicular to a principal surface of the substrate and orthogonal to each other, and which are integrated with the substrate so that the orientations of interior angles of the orthogonal side faces are aligned with each other. In the reflector array optical device, the plurality of dihedral corner reflector array optical elements are characterized in that the end faces of the substrates are bonded together so that the line of intersection of the orthogonal side faces of the plurality of dihedral corner reflectors is parallel to the normal to the substrate. That is, the reflector array optical device of the present invention is a large-area dihedral corner reflector array optical element assembly which is made up of a plurality of dihedral corner reflector array optical elements that are tiled (filled on one plane).

The reflector array optical device of the present invention may be configured such that those of the plurality of dihedral corner reflector array optical elements that are adjacent to each other are disposed so that the orientations of the interior angles of the orthogonal side faces of the plurality of dihedral corner reflectors are aligned with each other.

The reflector array optical device of the present invention may be configured such that the plurality of dihedral corner reflectors are aligned with the same pitch in a matrix, and those of the plurality of dihedral corner reflector array optical elements that are adjacent to each other are disposed so that the orthogonal side faces of the plurality of dihedral corner reflectors are aligned with each other in parallel.

The reflector array optical device of the present invention may be configured such that each of the plurality of dihedral corner reflector array optical elements is made of a transparent material, and each of the plurality of dihedral corner reflectors is a projection which has a prismatic shape protruded from the substrate.

The reflector array optical device of the present invention may be configured such that the prismatic shape has a side face which is opposed to the line of intersection of the orthogonal side faces and tilted from the normal to the substrate, and the prismatic shape also includes a frustum of a pyramid shape which has a bottom surface integrated with the substrate and a top surface having an area less than that of the bottom surface. That is, each of the dihedral corner reflector array optical elements is configured to have a plurality of the frustums each having truncated pyramid protruded from a surface of the substrate integrally molded of a transparent material; two orthogonal ones of the four side faces of each truncated pyramid are formed as a plane perpendicular to the substrate (dihedral corner reflector); and those other than the two side faces are formed as a plane which is tilted so that the plane (top surface) opposed to the substrate is smaller than the plane (bottom surface) toward the substrate surface of the truncated pyramid. This reflector array optical device is preferably configured such that a side face tilted from the normal to the substrate has an angle of inclination of 5 degrees or larger and 25 degrees or smaller. An angle of inclination of 5 degrees or larger would serve as a so-called "draft taper," thereby facilitating removal of the dihedral corner reflector array optical element molded article from the molds. When the removal of the dihedral corner reflector array optical element from a stamper is taken into consideration, greater angles of inclination would be preferable. However, excessive angles would cause the area of the top surface of the aforementioned truncated pyramid, which transmits a light beam reflected on the dihedral corner reflector, to be reduced to thereby darken a real image (real mirror image) of the object being observed. On the other hand, a sufficiently enough top surface area would lead to an increase in the bottom surface area of the aforementioned truncated pyramid and thus a decrease in the number of the dihedral corner reflectors per unit area, thereby also causing the real image (real mirror image) of the object being observed to be darkened. Molding experiments were conducted on these mutually contradictory phenomena using stampers having various angles of inclination. As a result, the aforementioned angle of inclination is preferably 5 degrees or larger and 25 degrees or smaller. The aforementioned truncated pyramid has two side faces (excluding the top surface and the bottom surface) other than those two side faces which form the dihedral corner reflector and are both tilted as mentioned above. The angles of inclination of both the side faces may or may not be equal to each other. The dihedral corner reflector array optical element is preferably manufactured by resin molding.

The reflector array optical device of the present invention may be configured such that each of the plurality of dihedral corner reflectors is formed as a hole in a prismatic shape which penetrates the substrate and part of the inner wall of which is mirror finished as the orthogonal side faces.

The reflector array optical device of the present invention may be configured such that the substrate has an end face parallel to one of the orthogonal side faces.

The reflector array optical device of the present invention may be configured such that the substrate has a flat end face which intersects one of the orthogonal side faces at an angle of larger than 0 degree or larger and smaller than 45 degrees.

The reflector array optical device of the present invention may be configured such that the substrate has a flat end face which intersects one of the orthogonal side faces at an angle of 45 degrees.

The reflector array optical device of the present invention may be configured such that the end face of the substrate is mirror finished.

The reflector array optical device of the present invention may be configured such that an optical adhesive is filled only in between the end faces of the substrates.

The reflector array optical device of the present invention may be configured to have a transparent flat plate which is stacked on the principal surface of the substrate opposite to the plurality of dihedral corner reflectors.

Provided is a method for manufacturing a reflector array optical device according to the present invention which allows a real image of an object being observed that is disposed toward one side of a principal plane to be formed in a space toward the other side of the principal plane. The method is characterized by including: a step of forming at least two dihedral corner reflector array optical elements, the dihedral corner reflector array optical element including a substrate and a plurality of dihedral corner reflectors which each have at least two orthogonal side faces, the orthogonal side faces being perpendicular to the principal surface of the substrate and orthogonal to each other, and which are integrated with the substrate so that the orientations of the interior angles of the orthogonal side faces are aligned with each other; a step of covering, with a masking material, the plurality of dihedral corner reflectors on the principal surface of the substrate adjacent to the end face of the substrate of each of the two dihedral corner reflector array optical elements to be adhered to each other; a step of bonding together the two dihedral corner reflector array optical elements while an optical adhesive is being supplied into between the end faces of the substrates to be adhered to each other so as to extrude part of the optical adhesive in between the end faces of the substrates from the surface of the masking material; and a step of removing the masking material from the plurality of dihedral corner reflectors on the principal surfaces of the substrates in conjunction with part of the optical adhesive. The masking material prevents the optical adhesive from entering the portion in which a plurality of protruded projections (dihedral corner reflectors) are disposed. An optical adhesive left in between the plurality of projections may cause a change in conditions after the manufacturing when a light beam propagating through the projections is reflected on the surface of the projections. Thus, the masking material and the subsequent removal of the masking material have an effect of preventing a change in reflection conditions.

In the method for manufacturing the reflector array optical device of the present invention, the step of bonding may include a step of allowing the end faces of the substrates to be adhered to each other of the two dihedral corner reflector array optical elements to be brought into contact with each other before supplying an optical adhesive into between the end faces of the substrates, and allowing an adhesive tape to be affixed to and thereby couple between the principal surfaces of the substrates in such a positional relation as to bridge between the end faces of the adhered substrates. The method may be configured such that with a corner edge coupled portion as a fulcrum (rotational center), the coupled portion being provided by the adhesive tape before the two dihedral corner reflector array optical elements are bonded together, the end faces of the adjacent substrates are opened, and after the optical adhesive is supplied into between the end faces, the end faces of the substrates are closed and thereby bonded together. That the dihedral corner reflector of the dihedral corner reflector array optical element is formed to the vicinity of the end face of the element is preferable because the seam is made unnoticeable.

The method for manufacturing a reflector array optical device of the present invention may be configured such that in the bonding step, before the optical adhesive is supplied into between the end faces of the substrates, the two dihedral corner reflector array optical elements are disposed on the same plane of a flat plate so that the end faces of the substrates thereof to be adhered to each other are opposed to each other; and after the optical adhesive is supplied into between the end faces of the substrates to be adhered to each other, the end faces of the substrates are pushed against each other and bonded together.

The method for manufacturing a reflector array optical device of the present invention may be configured such that in the bonding step, the optical adhesive is supplied onto the same plane of a transparent flat plate, and the two dihedral corner reflector array optical elements are disposed on the transparent flat plate, to which the optical adhesive has been supplied, so that the end faces of the substrates thereof to be adhered to each other are opposed to each other; and the optical adhesive is supplied into between the end faces of the substrates to be adhered to each other, and the end faces of the substrates are pushed against each other so as to bond together the transparent flat plate and the two dihedral corner reflector array optical elements.

According to the bonding step in which the adhesive tape, the flat plate, or the transparent flat plate is used, bonding can be performed in a positional relation in which the principal surfaces toward the projections and the principal surfaces opposite thereto of adjacent dihedral corner reflector array optical elements are aligned with the respective counterparts (without causing any step heights). When a step height occurs between the principal surfaces of the adjacent substrates, there would occur distortion in a real mirror image at the bonded portion. However, the aforementioned bonding step can prevent such a real mirror image distortion.

The method for manufacturing a reflector array optical device of the present invention is configured such that the masking material includes a water-soluble masking material. The method for manufacturing a reflector array optical device of the present invention is configured such that in the step of removing the masking material, ultrasonic cleaning is performed in water. The ultrasonic cleaning is outstandingly preferred in removal of the masking material.

Provided is a method for manufacturing a reflector array optical device according to the present invention which allows a real image of an object being observed that is disposed toward one side of a principal plane to be formed in a space toward the other side of the principal plane. The method is characterized by including: a step of forming at least two dihedral corner reflector array optical elements, the dihedral corner reflector array optical element including a substrate made up of a transparent material, and a plurality of dihedral corner reflectors which are each a projection having at least two orthogonal side faces, the side faces being perpendicular to the principal surface of the substrate and orthogonal to each other, the projection also having a top surface parallel to the principal surface of the substrate, and which are integrated with the substrate so that the orientations of interior angles of the orthogonal side faces are aligned with each other; a step of allowing the end faces of the substrates of each of the dihedral corner reflector array optical elements to be bonded together with an adhesive; and a grinding step of allowing the opposite side of the substrate, on which the plurality of dihedral corner reflectors of the dihedral corner reflector array optical elements that have been bonded together are formed, to be ground and thereby mirror-finished so as to make the substrates less in thickness than when being bonded together. The grinding step is performed at least either by polishing or by cutting. The grinding step for making the substrates less in thickness than when being bonded together is executed after the step of bonding the element end faces together, thereby achieving a large-area dihedral corner reflector array optical element which has an element end face bonded portion that is unnoticeable.

In the covering step of the method for manufacturing a reflector array optical device of the present invention, all of the plurality of dihedral corner reflectors are covered with the masking material; in the grinding step, the substrates are ground to zero in thickness so as to remove the substrates and expose all of the plurality of dihedral corner reflectors and the masking material; after the grinding step, further performed is an adhering step for adhering a transparent substrate to the exposed surface of all of the plurality of dihedral corner reflectors and the masking material; and after the adhering step, further performed is a removal step for removing the masking material from the plurality of dihedral corner reflectors on the transparent substrates in conjunction with part of the adhesive. Here, prepared is another seamless transparent substrate which has an area greater than that of the plurality of dihedral corner reflector array optical elements that have been bonded together. After the substrates are completely removed, the dihedral corner reflectors are re-arranged by being adhered to the another transparent substrate, thereby making it possible to make a reflector array optical device which has the another transparent substrate and the plurality of dihedral corner reflectors adhered thereto (a plurality of projections having orthogonal side faces with the orientations of the interior angles thereof aligned in a certain direction). That is, by executing the step of covering with the masking material, the grinding step of removing the substrates, the transparent substrate adhesion step, the step of removing the masking material, it is possible to eliminate the dihedral corner reflector array optical element substrates that may cause a seam and thereby achieve a seamless large-area dihedral corner reflector optical device. The other principal surface opposite to the principal surface of the transparent substrate on which the plurality of dihedral corner reflectors are formed is a mirror surface.

Advantageous Effects of the Invention

According to the reflector array optical device of the present invention, it is possible to achieve a large real mirror image forming optical system which allows a bright real image (real mirror image) of an object being observed to be formed in a space toward an observer.

According to the method for manufacturing the reflector array optical device of the present invention, it is possible to achieve a large reflector array optical device which makes the seam of the dihedral corner reflector array optical elements unnoticeable and which allows a bright real image (real mirror image) of an object being observed to be formed in a space toward an observer.

DESCRIPTION OF EMBODIMENTS

Now, with reference to the drawings, a description will be made to a reflector array optical device according to an embodiment of the present invention.

Figure 1:
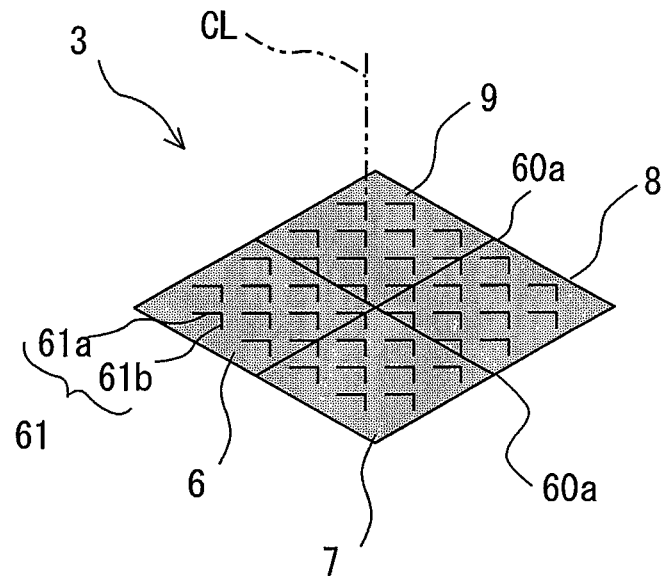
FIG. 1 is a schematic perspective view conceptually illustrating an example configuration of a reflector array optical device according to an embodiment of the present invention.

FIG. 1 is a perspective view schematically illustrating the configuration of a reflector array optical device 3 according to an embodiment. The reflector array optical device 3 is configured as one larger panel as a whole in a manner such that the same dihedral corner reflector array optical elements 6, 7, 8, and 9 (four smaller panels) are brought into contact with each other on one plane so as to be disposed in parallel with the end faces thereof bonded together. Furthermore, each of the four dihedral corner reflector array optical elements 6, 7, 8, and 9 has a plurality of dihedral corner reflectors 61 that are provided side by side so as to be located on the same plane. Each of the dihedral corner reflectors 61 is made up of two mutually orthogonal mirror surfaces 61*a* and 61*b*. A number of dihedral corner reflectors 61 are aligned to be disposed in an array, that is, in a grid pattern. The dihedral corner reflector array optical elements 6, 7, 8, and 9 are bonded together so as to form a collective array region of the plurality of dihedral corner reflectors 61. As shown in FIG. 1, the four dihedral corner reflector array optical elements 6, 7, 8, and 9 are configured in a manner such that the end faces 60*a* of the substrates of the dihedral corner reflector array optical elements 6, 7, 8, and 9 are bonded together so that the line of intersection CL of the mirror surfaces 61*a* and 61*b* of all the dihedral corner reflectors 61 is parallel to the normal to the principal plane of all the dihedral corner reflector array optical elements.

Figure 2:
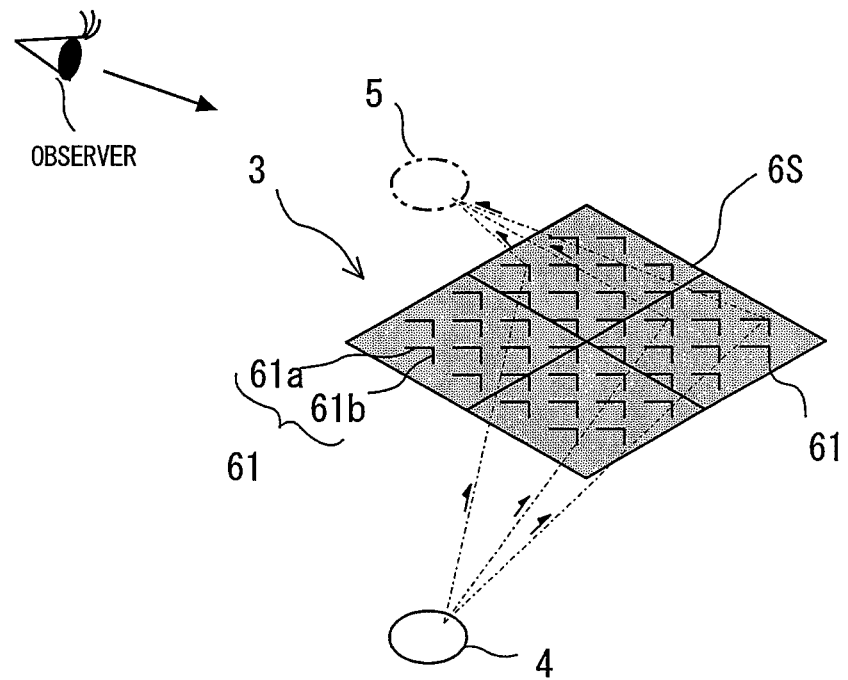
FIG. 2 is an explanatory schematic perspective view illustrating the operation of the reflector array optical device of FIG. 1.

As shown in FIG. 2, when an object being observed 4 is placed toward one side of a principal plane of the reflector array optical device 3, the reflector array optical device 3 forms a real image 5 (real mirror image) of the object being observed in a space toward the other side of the principal plane of the device. That is, the reflector array optical device 3 is capable of forming the real mirror image 5 of the object being observed 4 at a surface symmetric position with respect to an element plane 6S as the symmetric surface. The element plane 6S of the reflector array optical device 3 is a virtual plane which is generally perpendicular to each of the two mirror surfaces 61*a* and 61*b* that constitute the dihedral corner reflector 61. Note that since the dihedral corner reflector 61 is very small (on the order of μm) as compared with the entire size of the reflector array optical device 3 (on the order of a few tens of cm to a few m), the entire collection of the dihedral corner reflectors 61 is expressed in gray in FIGS. 1 and 2 and the orientation of the interior angle thereof is conceptually expressed in a V-shape.

Figure 3:
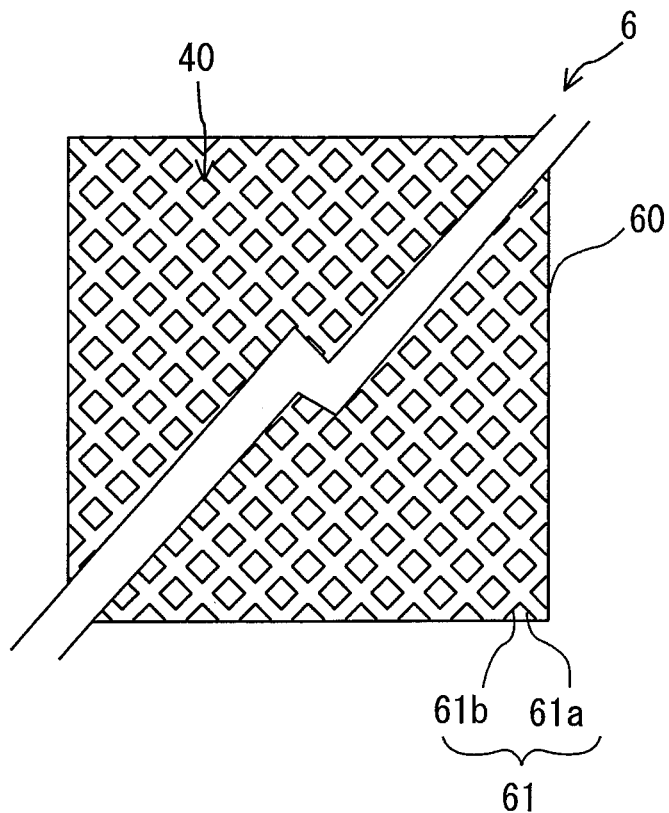
FIG. 3 is a schematic partial plan view schematically illustrating part of a dihedral corner reflector array optical element of a reflector array optical device according to an embodiment of the present invention.

FIG. 3 is a partial plan view specifically illustrating part of a dihedral corner reflector array optical element of one example of the four smaller panels. The dihedral corner reflector array optical element 6 is made up of a plurality of rectangular parallelepiped projections 40 arranged in a grid pattern and a substrate 60 for holding these projections, the projections 40 and the substrate 60 being integrally molded of a transparent material. The plurality of rectangular parallelepiped projections 40 that each have the same prismatic shape are aligned on a surface of the dihedral corner reflector array optical element 6. The dihedral corner reflector array optical element 6 has a flat rear surface.

Figure 4:
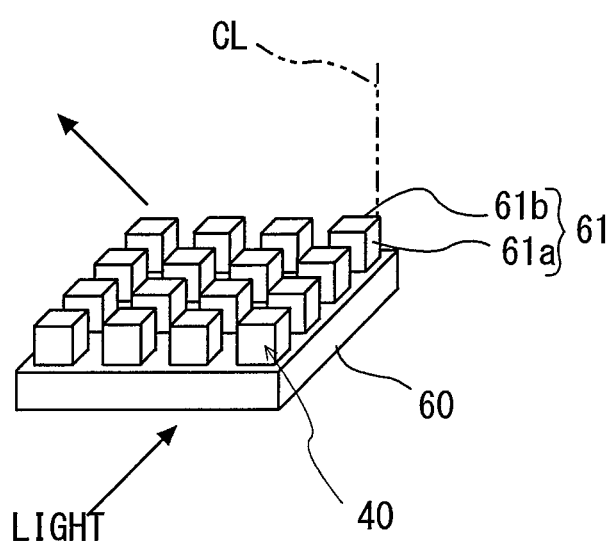
FIG. 4 is a partially broken schematic perspective view schematically illustrating a dihedral corner reflector of part of the dihedral corner reflector array optical element of FIG. 3.

FIG. 4 is a perspective view illustrating part of the dihedral corner reflector array optical element 6 (4×4 rectangular parallelepiped projections 40) of FIG. 3. The protruded projection 40 has four side faces that are perpendicular to the principal surface of the substrate 60. The inner wall surfaces 61*a* and 61*b* of two adjacent orthogonal side faces of each of the rectangular parallelepiped projections 40 serve as the dihedral corner reflector 61. A light beam that is incident through the substrate 60 and directed to the inner wall surfaces 61*a* and 61*b* of the rectangular parallelepiped projection 40 is reflected twice on the inner wall surfaces 61*a* and 61*b* (mirror surfaces) and then transmitted through the top surface of the rectangular parallelepiped projection 40.

Methods for manufacturing the dihedral corner reflector array optical element includes an injection molding method and a hot-press molding method in which employed are resin such as acrylic and molds. The mold such as a stamper can be manufactured by a reverse electroforming method after the shape corresponding to the projection (a rectangular parallelepiped or cube) is manufactured by nano-processing on a metal master plate. As other methods for manufacturing the dihedral corner reflector array optical element, for example, a direct X-ray lithography method can be employed to manufacture a plurality of rectangular parallelepipeds or cubes having four perpendicular sidewalls directly on a transparent resin substrate.

On the other hand, as the dihedral corner reflectors 61, the inner wall of a cubic through-hole 50 penetrating the substrate can be employed in addition to those that use, as a mirror surface, the inner wall of a transparent rectangular parallelepiped projection that is protruded from the surface of the transparent substrate.

Figure 5:
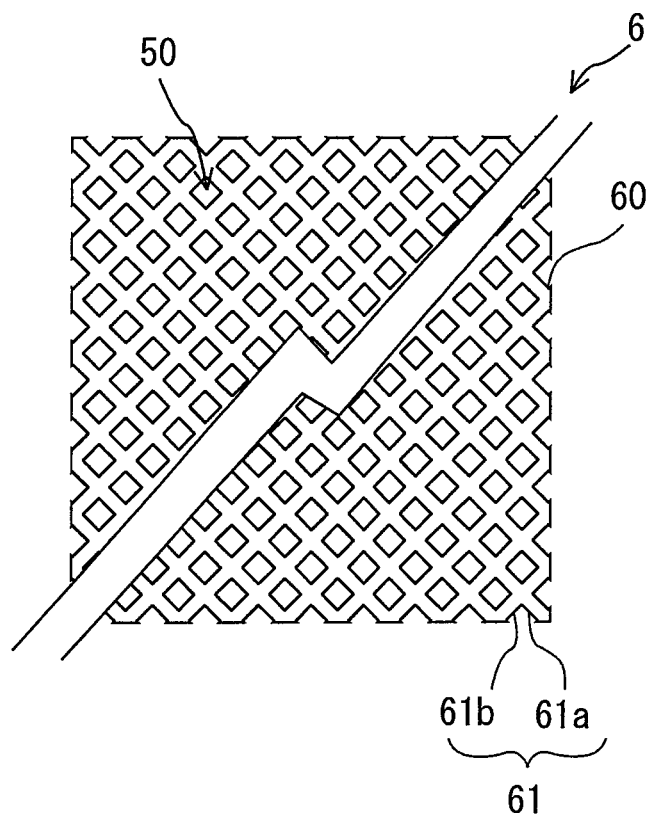
FIG. 5 is a schematic partial plan view schematically illustrating part of a dihedral corner reflector array optical element of a reflector array optical device according to another embodiment of the present invention.
Figure 6:
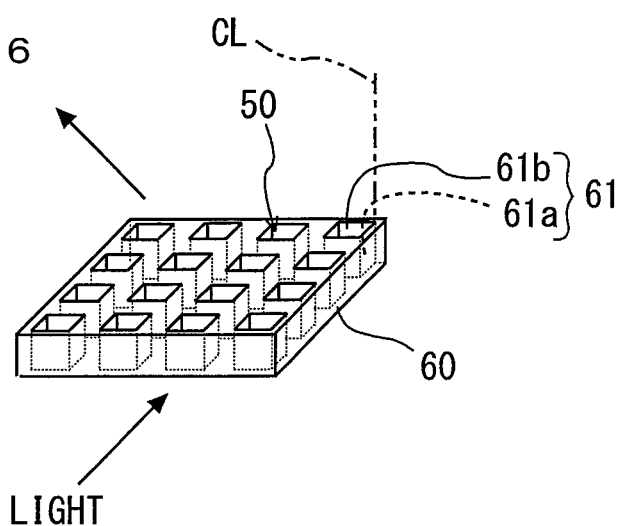
FIG. 6 is a partially broken schematic perspective view schematically illustrating a dihedral corner reflector of part of the dihedral corner reflector array optical element of FIG. 5.

FIG. 5 is a plan view illustrating part of one dihedral corner reflector array optical element 6 or one smaller panel that can constitute a reflector array optical device according to another embodiment. A plurality of through-holes 50 that have each the same cubic shape are aligned on a surface of the dihedral corner reflector array optical element 6. FIG. 6 is a perspective view illustrating part of the dihedral corner reflector array optical element 6 of FIG. 5 (4×4 cubic through-holes 50). The four inner side faces of the cubic through-hole 50 are perpendicular to the principal surface of the substrate 60. Two adjacent orthogonal side faces of the cubic through-hole 50 or the inner wall surfaces 61*a* and 61*b* are the dihedral corner reflectors 61. The dihedral corner reflector array optical element 6 is made up of the substrate 60 formed of a transparent material and a plurality of cubic through-holes 50 that penetrate the substrate and are disposed in a grid pattern. As shown in FIG. 6, a light beam that is incident from one surface of the substrate 60 and directed to the inner wall surfaces 61*a* and 61*b* of the cubic through-holes 50 is reflected twice on the inner wall surfaces 61*a* and 61*b* and then transmitted from the other surface of the cubic through-holes 50.

The dihedral corner reflector array optical element having a plurality of through-holes can be made by manufacturing a reverse shape of optical holes by nano-processing in a metal master plate so as to perform a reverse transfer of metal such as aluminum or nickel by electroforming thereon; and finally, by removing the metal master plate.

Figure 7:
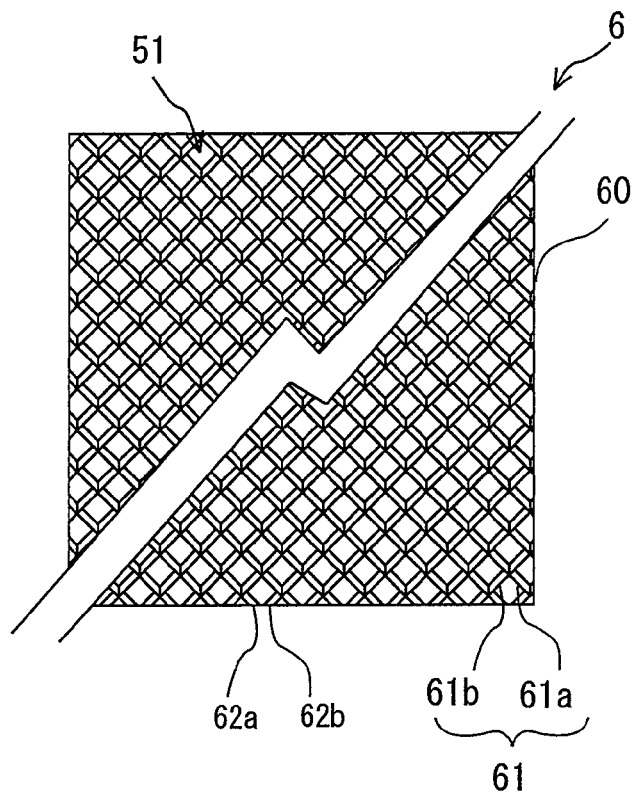
FIG. 7 is a schematic partial plan view schematically illustrating part of a dihedral corner reflector array optical element of a reflector array optical device according to another embodiment of the present invention.
Figure 8:
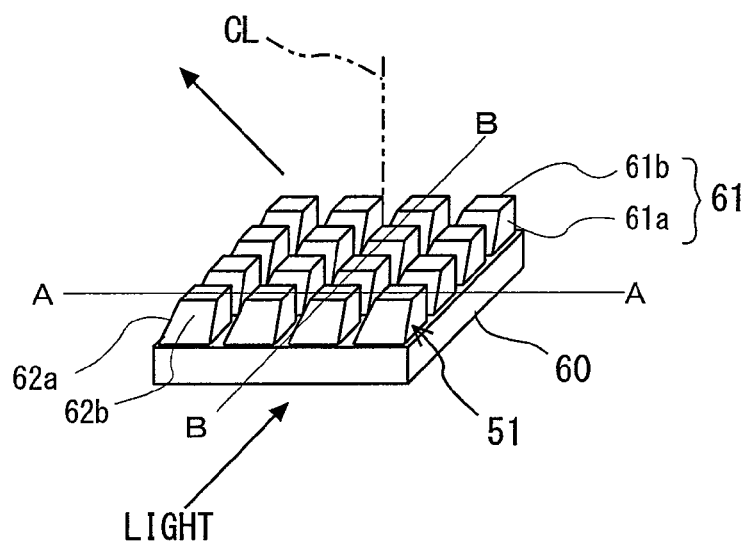
FIG. 8 is a partially broken schematic perspective view schematically illustrating a dihedral corner reflector of part of the dihedral corner reflector array optical element of FIG. 7.

Furthermore, FIG. 7 is a plan view illustrating part of the dihedral corner reflector array optical element 6 of one of four smaller panels according to still another embodiment. FIG. 8 is a perspective view illustrating part of the dihedral corner reflector array optical element 6 of FIG. 7 (4×4 projections of truncated pyramids 51). The dihedral corner reflector array optical element 6 is made up of the substrate 60 formed of a transparent material and a plurality of projections of truncated pyramids 51 molded thereon integrally in a grid pattern. The plurality of projections of truncated pyramids 51 that each have the same prismatic shape are aligned on a surface of the dihedral corner reflector array optical element 6. Two of the four inner side faces of the projection of truncated pyramid 51 are perpendicular to the principal surface of the substrate 60, and the other two side faces serve as a tapered surface that are tilted relative to the normal to the substrate 60. The two adjacent orthogonal inner wall surfaces 61*a* and 61*b* of the projection of truncated pyramid 51 are the dihedral corner reflectors 61. The protruded projection formed on the surface a molded article is provided with a tapered surface or a so-called "draft taper," thereby facilitating removal of the molded article or the dihedral corner reflector array optical element from the mold such as a stamper.

As shown in FIG. 8, a light beam that is incident from the substrate 60 and directed to the inner wall surfaces 61a and 61b of the projection of truncated pyramid 51 is reflected twice on the inner wall surfaces 61a and 61b and then transmitted from the top surface of the projections of truncated pyramids 51.

Figure 9:
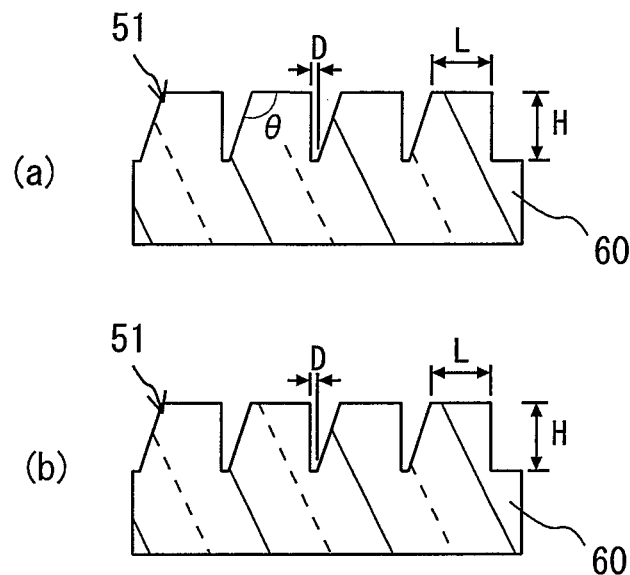
FIG. 9($a$) is a cross-sectional view taken along line A-A of FIG. 8, and FIG. 9($b$) is a cross-sectional view taken along line B-B of FIG. 8.
Figure 10:
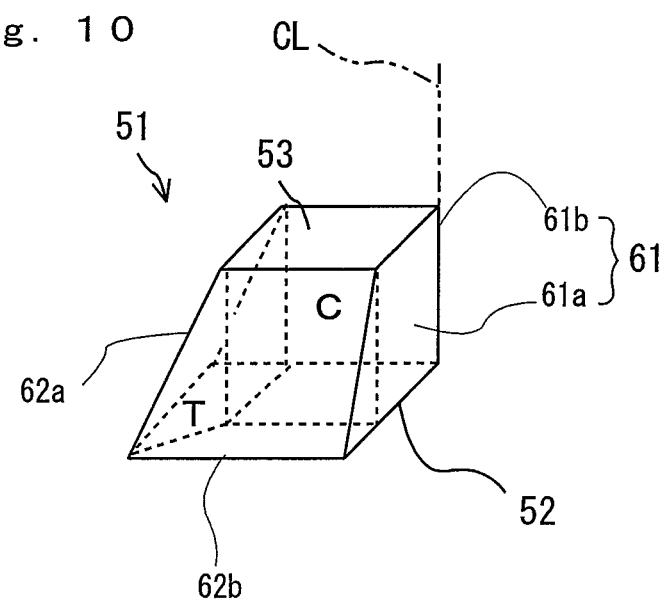
FIG. 10 is a perspective view schematically illustrating one truncated pyramid of a dihedral corner reflector array optical element according to an embodiment of the present invention.

Now, a detailed description will be made to one dihedral corner reflector array optical element 6 that has the projections of truncated pyramids 51. FIG. 9 shows enlarged partial cross-sectional views taken along lines A-A and B-B of FIG. 8. FIG. 10 is a perspective view schematically illustrating one projection of truncated pyramid 51 of the dihedral corner reflector array optical element.

Each projection of truncated pyramid 51 shown in FIG. 8 is provided with two orthogonal side faces (the mirror surfaces 61a and 61b) as the dihedral corner reflector 61, and side faces 62a and 62b other than the two mirror surfaces except the top and bottom surfaces that form the dihedral corner reflector are formed at a certain angle (an inclined surface) relative to the normal to the principal surface of the substrate 60. FIG. 8 does not show the side face 62a since the side face 62a is hidden behind the projection of truncated pyramid 51. The sizes H, L, and D and angle θ of the projection of truncated pyramid 51 illustrated in FIG. 9 take on the following values: height H=170 μm, side L of the top square surface=150 μm, distance D=10 μm, and a taper angle θ=108°. The projection of truncated pyramid 51 has an inclined surface (at an angle of 18 degrees relative to a plane perpendicular to the substrate) in consideration of the draft taper at the time of resin molding. However, this value is only a typical value, and the present invention is not limited thereto.

As shown in FIG. 10, the projection of truncated pyramid 51 has a bottom surface 52 integrated with the substrate 60 and a top surface 53 having an area less than that of the bottom surface 52. The projection of truncated pyramid 51 is made up of a cubic portion C including the orthogonal side faces 61a and 61b of the dihedral corner reflector, and a tapered portion T including, as a planar surface, the side faces 62a and 62b other than the dihedral corner reflector integrated with the cubic portion C. The projection of truncated pyramid 51 is configured such that the two orthogonal side faces 61a and 61b of the four side faces 61a, 61b, 62a, and 62b are formed as a planar surface (the dihedral corner reflector 61) perpendicular to the substrate 60, and the side faces 62a and 62b other than those two side faces are formed as a planar surface that is tilted so that the planar surface (top surface) opposite to the substrate of the projection of truncated pyramid 51 is smaller than the planar surface (bottom surface) toward the substrate 60. According to the resin molding or the hot-press molding method, it is possible to form, on the thin flat substrate 60 with good mold releasability, a number of projections 51 (e.g., with a side of 50 to 200 μm) each having generally truncated pyramid shape (e.g., with square bottom surface) when viewed from above. It is preferable that the side faces 62a and 62b be tilted at an angle of inclination of 5 degrees or larger and 25 degrees or smaller relative to the normal to the substrate 60. Since the angle of inclination that is 5 degrees or larger would serve as a so-called "draft taper" in the resin molding method, this would facilitate removal of the molded article of the dihedral corner reflector array optical element 6 from the molds. When the removal of the dihedral corner reflector array optical element 6 from the stamper is taken into consideration, greater angles of inclination would be preferable. However, excessive angles would cause the area of the top surface of the projection of truncated pyramid 51, which transmits light reflected on the dihedral corner reflector 61, to be reduced and thereby darken the real image (real mirror image) of the object being observed. On the other hand, a sufficiently enough top surface area would lead to an increase in the bottom surface area of the projection of truncated pyramid 51 and thus a decrease in the number of the dihedral corner reflectors 61 per unit area, thereby also causing the real image (real mirror image) of the object being observed to be darkened. To examine these mutually contradictory phenomena, molding experiments were conducted using stampers having various angles of inclination. As a result, it was found that the aforementioned angle of inclination is preferably 5 degrees or larger and 25 degrees or smaller. The projection of truncated pyramid 51 includes two surfaces (excluding the top and bottom surfaces) other than the two side faces that form the dihedral corner reflector 61, and those two surfaces are tilted as described above. Here, the two surfaces may or may not have the same angle of inclination.

As shown in FIGS. 4, 6, and 8, any one of the dihedral corner reflector array optical elements 6 is configured such that the line of intersection CL formed by the two orthogonal side faces 61a and 61b of each of the dihedral corner reflectors 61 is orthogonal to the principal surface of the substrate 60. The dihedral corner reflectors 61 are each aligned along regular grid points so that the interior angles formed on the substrate 60 by all the orthogonal side faces 61a and 61b are oriented in the same orientation. That is, all the dihedral corner reflectors 61 are aligned with the same pitch in a matrix and integrated with the substrate 60 so as to be perpendicular to the principal surface of the substrate 60 and allow the orientations of the interior angles of the orthogonal side faces 61a and 61b to be aligned in a certain direction. For example, a plurality of the same rectangular dihedral corner reflectors 61 may be disposed in a rectangular arrangement on a rectangular substrate 60. The dihedral corner reflectors 61 do not always need to be regularly aligned from an optical viewpoint. However, the dihedral corner reflector array optical element is manufactured preferably in a regularly arranged fashion.

As shown in FIG. 1, the four dihedral corner reflector array optical elements 6, 7, 8, and 9 are bonded together on the planar end faces 60a of the substrates 60 so that the lines of intersection CL of the orthogonal side faces 61a and 61b of all the dihedral corner reflectors 61 (FIGS. 4, 6, and 8) are parallel to the normal to the substrates 60. The dihedral corner reflector array optical elements 6 adjacent to each other are disposed relative to each other and bonded together so that the orthogonal side faces 61a and the orthogonal side faces 61b of the plurality of dihedral corner reflectors 61 are aligned in parallel to the respective counterparts. The plurality of dihedral corner reflector array optical elements adjacent to each other are disposed relative to each other so that the orientations of the interior angles of the orthogonal side faces 61a and 61b of the plurality of dihedral corner reflectors 61 are aligned with each other. It is thus possible to obtain a large reflector array optical device 3 that projects a bright real image of an object being observed.

[First Method for Manufacturing a Reflector Array Optical Device]

First, a description will be made to the pretreatment of the dihedral corner reflector array optical element before being bonded together.

Figure 11:
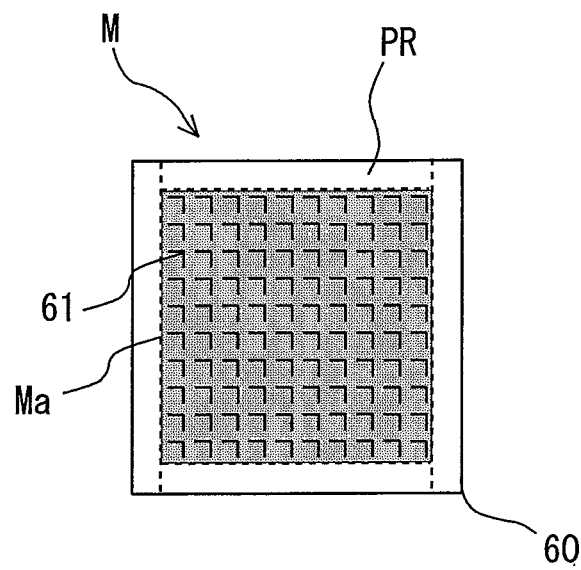
FIG. 11 is a plan view conceptually illustrating a dihedral corner reflector array optical element molded article for a dihedral corner reflector array optical element of a reflector array optical device according to an embodiment of the present invention.
Figure 12:
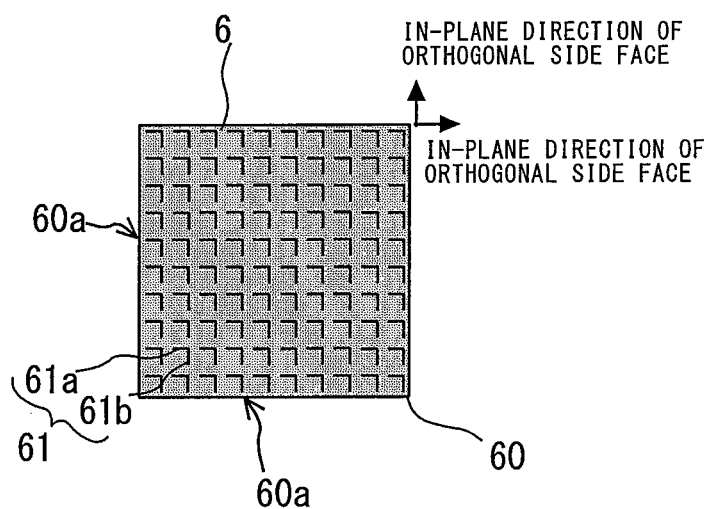
FIG. 12 is a schematic plan view conceptually illustrating a dihedral corner reflector array optical element cut from the dihedral corner reflector array optical element molded article of FIG. 11.

FIG. 11 illustrates a dihedral corner reflector array optical element molded article for the dihedral corner reflector array optical element. To pull the dihedral corner reflector array optical element molded article M out of the molds in the manufacturing process of the resin molding method, the dihedral corner reflector array optical element molded article M is provided with a peripheral rim PR around an array region Ma of a plurality of dihedral corner reflectors 61 with the dihedral corner reflectors 61 integrally molded on the principal surface of the substrate 60. Since the peripheral rim PR is not required for bonding, the surrounding peripheral rim PR is cut away along straight lines (the broken lines show the cutting lines) in the vicinity of the array region Ma boundary using cutting means such as acrylic cutters, thereby obtaining the rectangular dihedral corner reflector array optical element 6 from the array region Ma (FIG. 12). As shown in FIG. 12, the dihedral corner reflector array optical element 6 has the planar end faces 60*a* that are parallel to the orthogonal side faces 61*a* and 61*b* of the dihedral corner reflector 61.

Figure 13:
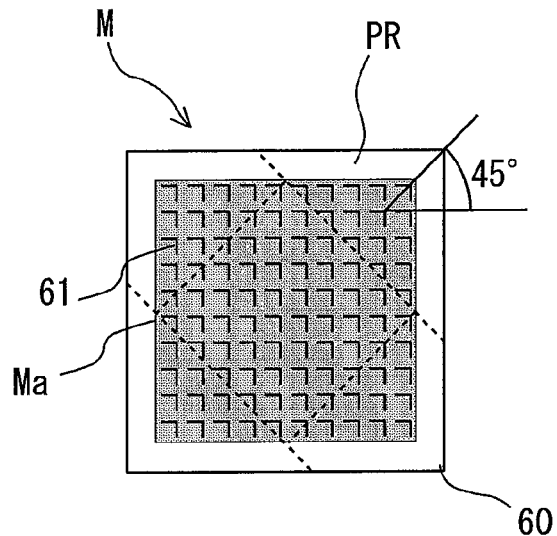
FIG. 13 is a plan view conceptually illustrating a dihedral corner reflector array optical element molded article for a dihedral corner reflector array optical element of a reflector array optical device according to an embodiment of the present invention.
Figure 14:
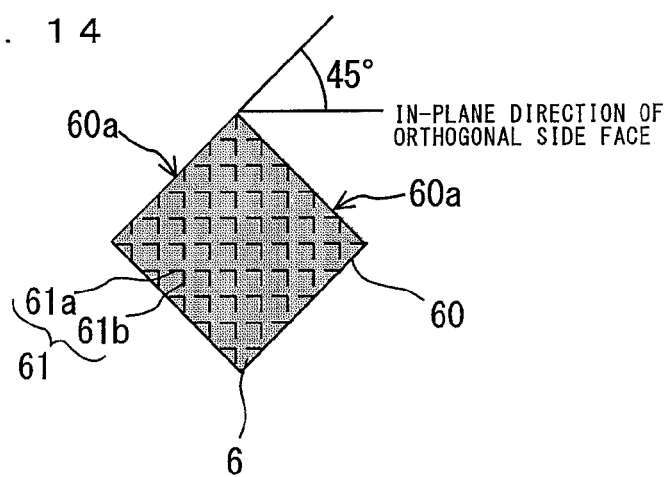
FIG. 14 is a schematic plan view conceptually illustrating a dihedral corner reflector array optical element cut from the dihedral corner reflector array optical element molded article of FIG. 13.

Furthermore, as shown in FIG. 13, to obtain the dihedral corner reflector array optical element 6 in a desired shape, it is also possible to cut part of the surrounding peripheral rim PR and the array region Ma along straight lines (the broken lines show the cutting lines). For example, a rectangular dihedral corner reflector array optical element 6 is obtained by cutting the array region Ma along a bisector (45°) of the interior angle of the dihedral corner reflector 61 and a line perpendicular to the bisector (FIG. 14). As shown in FIG. 14, the substrate 60 of the resulting rectangular dihedral corner reflector array optical element 6 has the flat end faces 60*a* that intersect the orthogonal side faces 61*a* and 61*b* at an angle of 45 degrees.

Figure 15:
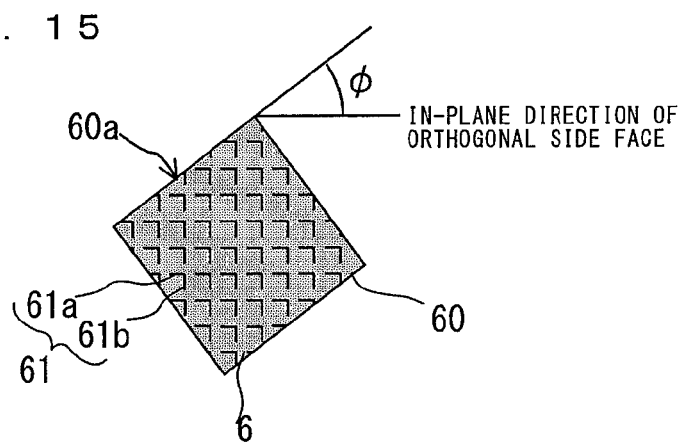
FIG. 15 is a schematic plan view conceptually illustrating a dihedral corner reflector array optical element according to another embodiment of the present invention.

As shown in FIG. 15, it is also possible to cut, from a dihedral corner reflector array optical element integrally-molded article, the rectangular dihedral corner reflector array optical element 6 that has flat end faces 60*a* that intersect one of the orthogonal side faces 61*a* and 61*b* at an angle larger than zero and smaller than 45 degrees on the substrate 60. Note that FIGS. 11 to 15 illustrate the whole collection of the dihedral corner reflectors 61 in a gray color, and conceptually express the orientation of the interior angle of the dihedral corner reflector 61 in a V-shape.

Here, with the peripheral rim PR or the like having been cut, the section of the rim of the dihedral corner reflector array optical element 6 remains as a rough surface. This rough section needs to be polished with an abrasive agent so as to make a mirror surface of the section. Furthermore, the section of the rim of the dihedral corner reflector array optical element 6 is preferably polished with an abrasive agent so as to be not a wavy curved surface but a planar surface. The abrasive agent to be employed may be a commercially available plastic cleaner (e.g., made by SOFT99 corporation). The section of the dihedral corner reflector array optical element 6 is polished for a while using a cloth or BEMCOT moistened with the abrasive agent, and finally, washed in water. On the other hand, when the abrasive agent has entered the array region Ma of the dihedral corner reflectors 61, the abrasive agent adhered to the array region Ma of the dihedral corner reflectors 61 is removed in an ultrasonic cleaner.

Now, with reference to FIG. 16, a description will be made to the procedure of manufacturing a reflector array optical device by bonding together the two dihedral corner reflector array optical elements 6 shown in FIG. 12. Note that FIG. 16 emphasizes and conceptually illustrates the 4×4 projections of truncated pyramids 51 of the dihedral corner reflector array optical elements 6 in order to indicate the direction of the dihedral corner reflectors 61, and thus the number and the size thereof are not accurately shown.

Figure 16:
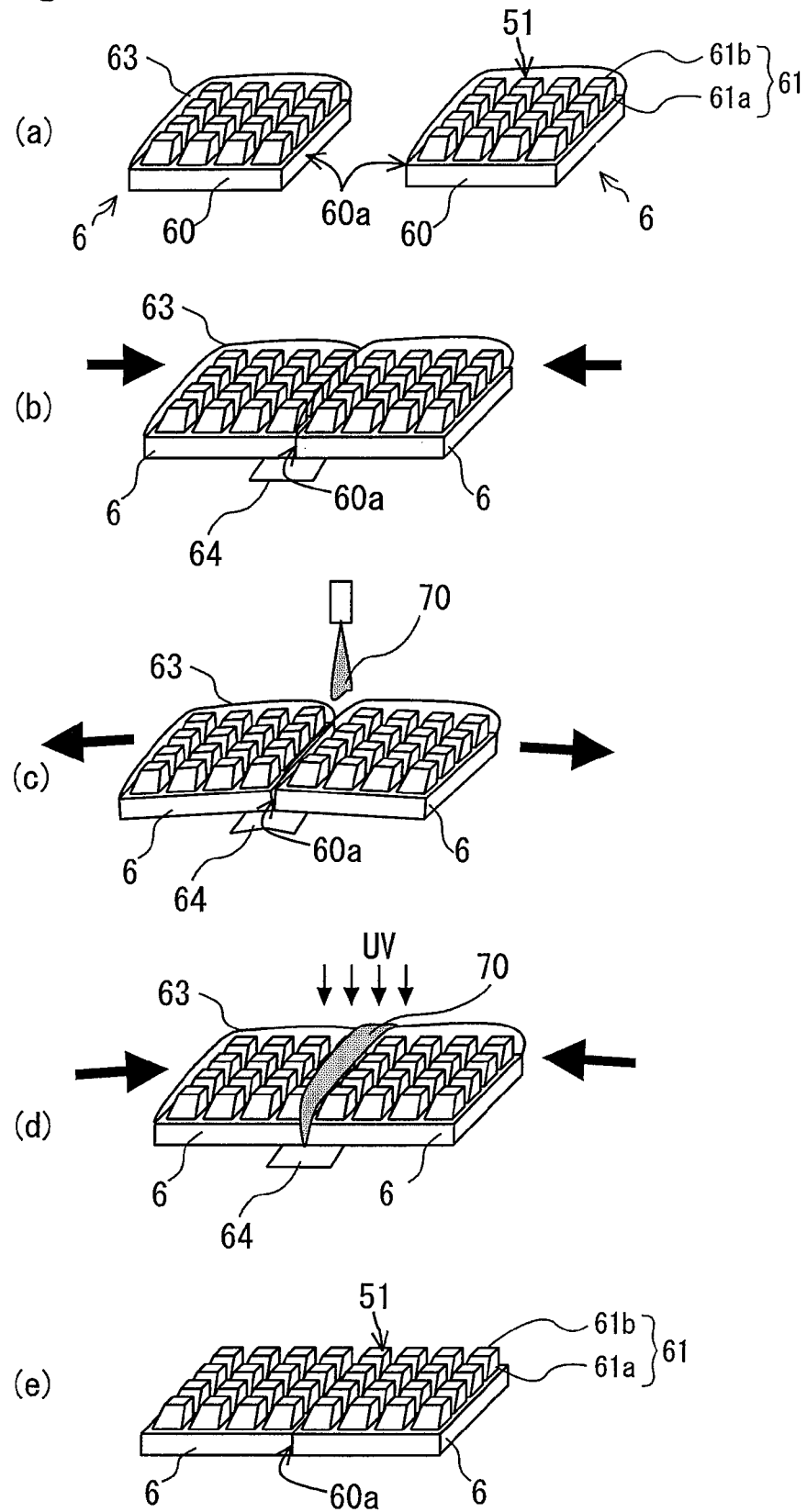
FIGS. 16($a$) to 16($e$) are perspective views schematically illustrating two dihedral corner reflector array optical elements to explain the procedure of steps for bonding together the dihedral corner reflector array optical elements in a first method for manufacturing a reflector array optical device according to the present invention.

Next, as shown in FIG. 16(*a*), a water-soluble masking material 63 is used to cover a plurality of projections of truncated pyramids 51 (the dihedral corner reflectors 61) on the principal surface of the substrate 60 adjacent to the end face 60*a* of the substrate 60 of each of the two dihedral corner reflector array optical elements 6 to be adhered to each other.

The masking material 63 may be used either to cover entirely the area on which the projections of truncated pyramids 51 are placed or to cover only part of the vicinity of the end face 60*a* (e.g., about 2 cm from the vicinity of a substrate section). An optical adhesive caught to remain in the gaps between the projections of truncated pyramids 51 may cause a change in reflection conditions when a light beam propagating through the projections of truncated pyramids 51 in the manufactured reflector array optical device is reflected on the surface of the projections of truncated pyramids 51. The masking material 63 serves to prevent this.

There is a possibility that when an adhesive with vinyl acetate resin emulsified in water is used as the masking material 63, the adhesive may cause excessively high adhesiveness, so that the masking material itself having penetrated into between the projections of truncated pyramids 51 cannot be removed. In contrast, a rubber-based masking material having an excessively low adhesion may not provide a good covering effect, so that the rubber-based masking material may strip off the ends of the substrate before the end faces 60*a* are adhered to each other. Furthermore, when being washed in ethanol or the like, the substrate and the projections of truncated pyramids which are made of an acrylic resin may be cracked because the acrylic resin has a low chemical resistance. In this context, this embodiment employs, as the masking material 63, a water-soluble chemical agent, GSI Creos Masking Sol (trademark), which has a good adhesion to the substrate. This allows the masking material to be readily removed when the end faces 60*a* of the dihedral corner reflector array optical elements 6 are adhered to each other and then soaked in water for ultrasonic cleaning. The masking material 63 is a peelable film-forming paint which has solvent resistance to an optical adhesive and insolubility to the dihedral corner reflector array optical element 6.

Now, as shown in FIG. 16(*b*), the substrate end faces 60*a* of the two dihedral corner reflector array optical elements 6 to be adhered to each other are brought into contact, and then an adhesive tape 64 is affixed to and thereby couples between the principal surfaces of the substrates 60 in such a positional relation as to bridge between the end faces 60*a* of the substrates being adhered to each other. Here, all the dihedral corner reflectors 61 of the two dihedral corner reflector array optical elements 6 are perpendicular to the principal surface of the substrates 60, and the orientation of the interior angles of the orthogonal side faces 61*a* and 61*b* are aligned in a certain direction.

The adhesive tape 64 (e.g., Sellotape (trade mark)) is affixed to the planar surface of the substrate having no projections of truncated pyramids 51. It is very important for the adhesive tape 64 to cause no step heights in the direction of the thickness of the dihedral corner reflector array optical elements 6 (substrates) in order to make the seam unnoticeable. The adhesive tape 64 has to be affixed so as not to cause a wrinkle or catch a bubble under the adhesive tape 64. The adhesive tape 64 can prevent a liquid-state optical adhesive from penetrating to the planar surface of the substrate.

Now, as shown in FIG. 16 (*c*), with a corner edge coupled portion as a fulcrum (rotational center), the coupled portion being provided by the adhesive tape 64 before the two dihedral corner reflector array optical elements 6 are bonded together, the end faces 60a of the adjacent substrates are opened, and then a liquid-state optical adhesive 70 is supplied into between the end faces 60a. Here, the surface on which the projections of truncated pyramids 51 are formed, the surface being opposite to the surface to which the adhesive tape 64 is affixed, is opened in a V shape, and then a certain amount of the liquid-state optical adhesive 70 is dispensed thereto several times through a tapered nozzle or the like. The optical adhesive 70 to be employed may be, for example, a UV curable resin that has a refractive index generally equal to the refractive index of the resin, such as acrylic, which forms the substrate 60. This allows for ensuring the amount of light that passes through the adhesive layer after the bonding, and preventing reflection of light on the boundary of the adhesive layer, thereby making the seam unnoticeable.

As shown in FIG. 16(d), while part of the optical adhesive 70 is being extruded from the surface of the masking material 63 through the gaps between the end faces 60a of the substrates and between the masking materials 63, the two dihedral corner reflector array optical elements 6 are bonded together. Here, by being retained in advance with the adhesive tape 64, the bonding can be performed in a positional relation in which the principal surfaces toward the projections and the principal surfaces opposite thereto of the substrates 60 of the dihedral corner reflector array optical elements 6 being bonded together are aligned with the respective counterparts without causing any step heights. The two dihedral corner reflector array optical elements 6 are forcibly pushed from both the sides against each other and then while being held in this state, irradiated with ultraviolet radiation so as to harden the optical adhesive 70. Although an unwanted amount of the optical adhesive 70 is extruded from the side of the projections of truncated pyramids 51 of the substrates 60, there will arise no problem because the masking material 63 protects the projections of truncated pyramids 51.

Then, the adhesive tape 64 is peeled off from the dihedral corner reflector array optical elements 6 that have been bonded together, so that the masking material 63 is removed from the principal surface of the substrate 60 in conjunction with part of the optical adhesive 70 (FIG. 16(e)). This allows for obtaining the reflector array optical device 3 in which the same two dihedral corner reflector array optical elements 6 are in contact with each other on one plane so as to be disposed side by side and joined together, the elements 6 having the plurality of projections of truncated pyramids 51 with the orientations of the interior angles of the orthogonal side faces 61a and 61b being aligned in a certain direction.

As shown in FIG. 16(d), a slightly greater amount of the optical adhesive 70 than required for bonding may be employed, thereby raising the optical adhesive 70 from the masking material 63 when the two dihedral corner reflector array optical elements 6 are pushed against each other from both the sides. This allows the optical adhesive 70 with the masking material 63 melted and hardened during ultrasonic cleaning to be slightly floated, so that an excess hardened optical adhesive 70 is easily peeled off and the optical adhesive is filled only in between the end faces of the substrates. In this manner, the portion to which the optical adhesive 70 is adhered is advantageously raised from the masking material when an unwanted amount of adhesive is peeled off. Furthermore, since excess hardened adhesive resin is removed, degradation in the sharpness of the real mirror image due to the lens effect of the excess hardened adhesive resin can be preferably prevented. It was also found that the faces to be adhered to each other of the dihedral corner reflector array optical elements 6 should be best polished to have as flat a mirror surface as possible. With the end faces 60a having bumps and dips, even use of an ultraviolet curable adhesive having a matched refractive index may not provide a clear view due to a white turbidity on the adhered section.

Figure 17:
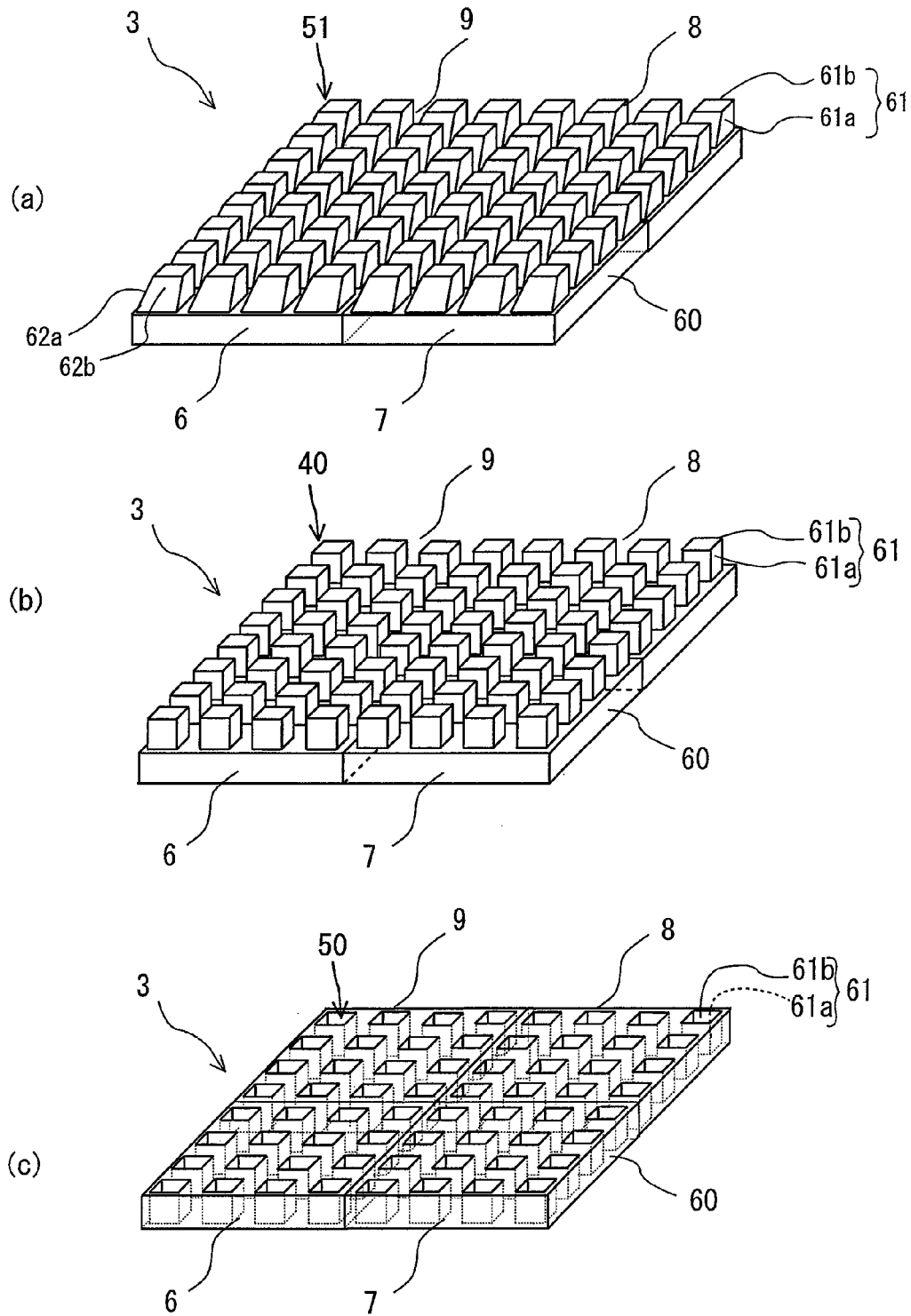
FIGS. 17($a$) to 17($c$) are schematic perspective views conceptually illustrating a reflector array optical device with four dihedral corner reflector array optical elements according to an embodiment of the present invention being bonded together.

The steps shown in FIG. 16 are repeated to manufacture a plurality of sets of the dihedral corner reflector array optical elements 6 that have been bonded together, and by repeating the steps shown in FIG. 16 on two bonded sets, obtained as shown in FIG. 17(a) is the reflector array optical device 3 in which the same dihedral corner reflector array optical elements 6, 7, 8, and 9 (four smaller panels) having a plurality of projections of truncated pyramids 51 are disposed side by side and joined together on one plane in contact with each other with no gap therebetween. In the same manner, the steps shown in FIG. 16 are repeated on the dihedral corner reflector array optical element 6 as shown in FIG. 3 to manufacture a plurality of sets of the dihedral corner reflector array optical elements 6 that have been bonded together, and by repeating the steps shown in FIG. 16 on two bonded sets, obtained as shown in FIG. 17(b) is the reflector array optical device 3 in which the same dihedral corner reflector array optical elements 6, 7, 8, and 9 (four smaller panels) having a plurality of through-holes 50 each having the same cubic shape are disposed side by side and joined together on one plane in contact with each other. In the same manner, the steps shown in FIG. 16 are repeated on the dihedral corner reflector array optical element 6 as shown in FIG. 5 to manufacture a plurality of sets of the dihedral corner reflector array optical elements 6 that have been bonded together, and by repeating the steps shown in FIG. 16 on two bonded sets, obtained as shown in FIG. 17 (c) is the reflector array optical device 3 in which the same dihedral corner reflector array optical elements 6, 7, 8, and 9 (four smaller panels) having a plurality of rectangular parallelepiped projections 40 are disposed side by side and joined together on one plane in contact with each other.

[Second Method for Manufacturing a Reflector Array Optical Device]

Figure 18:
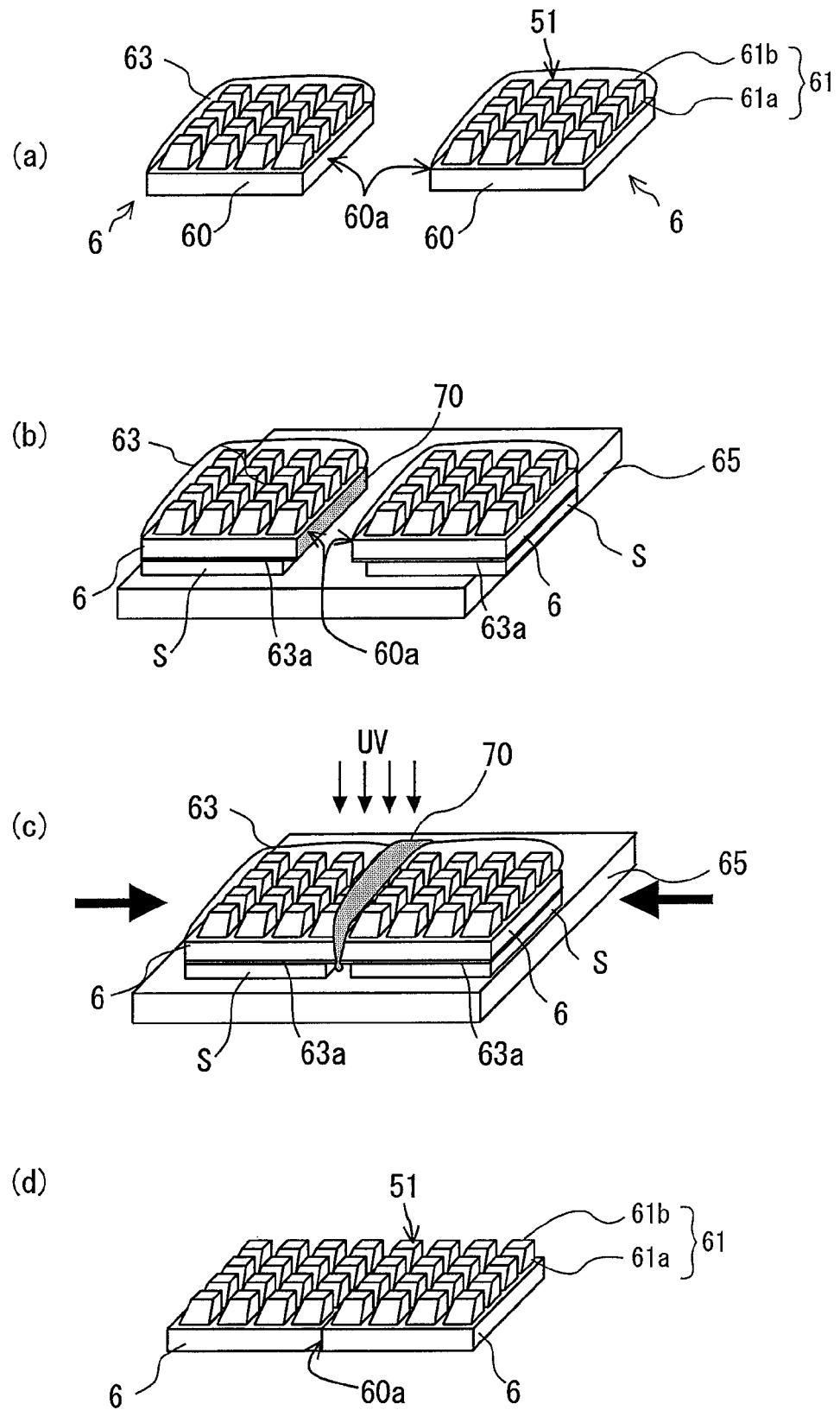
FIGS. 18($a$) to 18($d$) are perspective views schematically illustrating two dihedral corner reflector array optical elements to explain the procedure of steps for bonding together the dihedral corner reflector array optical elements in a second method for manufacturing a reflector array optical device according to the present invention.

First, as with the first manufacturing method described above, prepared are dihedral corner reflector array optical elements 6 that have been polished to have a mirror surface on the end face 60a of the substrate 60. Then, as shown in FIG. 18(a), as with the first manufacturing method described above, the masking material 63 is used to cover a plurality of dihedral corner reflectors 61 on the principal surface of the substrate 60 adjacent to the end face 60a of the substrate 60 of each of the two dihedral corner reflector array optical elements 6 to be adhered to each other. The opposite planar rear surface of the substrate 60 is also covered with a masking material 63a.

Next, prepared are a planar flat plate 65 serving as a surface plate and slider plates S or parallel flat plates which are easily slidable on the flat plate 65 and have the same thickness. Then, as shown in FIG. 18(b), the two dihedral corner reflector array optical elements 6 each on the slider plate S are disposed on the same plane of the flat plate 65 so that the end faces 60a of the substrates of the dihedral corner reflector array optical elements 6 to be bonded together are opposed to each other and the end faces 60a are protruded to each other from the end faces of the slider plates S. Before or after such disposition, the optical adhesive 70 is supplied and adhered to the end faces 60a of the substrates to be bonded together.

Then, as shown in FIG. 18(c), the end faces 60a of the substrates are pushed against each other and bonded together. The end faces of the slider plates S are not in contact with each other but kept spaced apart from each other. Here, the bonding is performed in a positional relation in which the principal surfaces toward the projections and the principal surfaces opposite thereto of the substrates 60 of the dihedral corner reflector array optical elements 6 being bonded together are aligned with the respective counterparts (without causing any step heights). The two dihedral corner reflector array optical elements 6 are forcibly pushed from both the sides against each other and then while being held in this state, irradiated with ultraviolet radiation so as to harden the optical adhesive 70. Although an unwanted amount of the optical adhesive 70 is extruded from both the surfaces of the substrate 60, there will arise no problem because the masking material 63 protects the projections of truncated pyramids 51 and even the opposite planar rear surface of the substrate 60 is also covered with the masking material 63a.

Next, the dihedral corner reflector array optical elements 6 bonded together are taken off the slider plates S on the flat plate 65. As in the first manufacturing method described above, the bonded dihedral corner reflector array optical elements are soaked in water for ultrasonic cleaning so as to remove the masking materials 63 and 63a from the plurality of dihedral corner reflectors 61 on the principal surfaces of the substrates 60 in conjunction with part of the optical adhesive 70 (FIG. 18(d)). This allows for obtaining the reflector array optical device 3 in which the same two dihedral corner reflector array optical elements 6 having the plurality of projections of truncated pyramids 51 are disposed side by side and joined together on one plane in contact with each other.

[Third Method for Manufacturing a Reflector Array Optical Device]

First, as with the first manufacturing method described above, prepared are dihedral corner reflector array optical elements 6 that have been polished to have a mirror surface on the end face 60a of the substrate 60. Then, as shown in FIG. 19(a), as with the first manufacturing method described above, the masking material 63 is used to cover a plurality of dihedral corner reflectors 61 on the principal surface of the substrate 60 adjacent to the end face 60a of the substrate 60 of each of the two dihedral corner reflector array optical elements 6 to be adhered to each other.

Next, as shown in FIG. 19(b), prepared is a transparent parallel flat plate 66 which is made of a transparent resin material such as acrylic, and the optical adhesive 70 is supplied to the same plane of the transparent flat plate 66. The optical adhesive 70 can be spread on the transparent flat plate 66 widely in a thin layer with a bar coater or the like.

Figure 19:
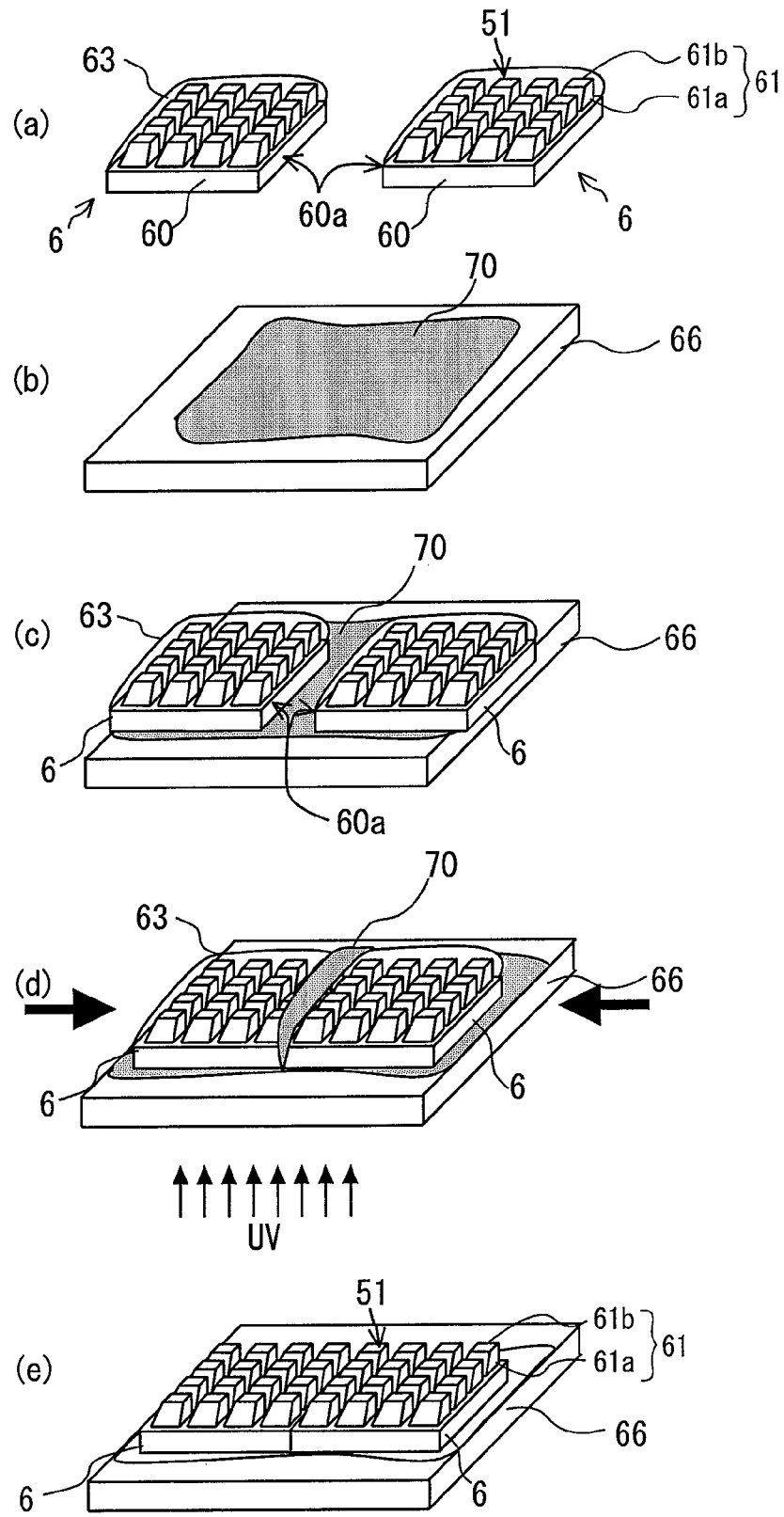
FIGS. 19($a$) to 19($e$) are perspective views schematically illustrating two dihedral corner reflector array optical elements to explain the procedure of steps for bonding together the dihedral corner reflector array optical elements in a third method for manufacturing a reflector array optical device according to the present invention.

Next, as shown in FIG. 19 (c), on the transparent flat plate 66 with the optical adhesive 70 supplied thereto, the two dihedral corner reflector array optical elements 6 are disposed so that the end faces 60a of the substrates thereof to be bonded together are opposed to each other, and then the optical adhesive 70 is supplied into between the end faces 60a of the substrates to be bonded together. The dihedral corner reflector array optical elements 6 are disposed on the transparent flat plate 66 so as not to allow bubbles to enter the optical adhesive 70.

Next, as shown in FIG. 19(d), the end faces 60a of the substrates are pushed against each other on the optical adhesive 70 on the transparent flat plate 66, and the transparent flat plate 66 and the two dihedral corner reflector array optical elements 6 are bonded together. Here, the bonding is performed in a positional relation in which the principal surfaces toward the projections and the principal surfaces opposite thereto of the substrates 60 of the dihedral corner reflector array optical elements 6 are aligned with the respective counterparts (without causing any step heights). The two dihedral corner reflector array optical elements 6 are forcibly pushed from both the sides against each other and then while being held in this state, irradiated with ultraviolet radiation so as to harden the optical adhesive 70.

Next, as with the first manufacturing method described above, the transparent flat plate and the bonded dihedral corner reflector array optical elements are soaked in water for ultrasonic cleaning so as to remove the masking material 63 from the plurality of dihedral corner reflectors 61 on the principal surfaces of the substrates 60 in conjunction with part of the optical adhesive 70 (FIG. 19(e)).

Next, although not illustrated, the transparent flat plate may be cut (trimmed) along the outer edge of the bonded dihedral corner reflector array optical elements. This allows for obtaining a reflector array optical device in which the two dihedral corner reflector array optical elements are disposed side by side and joined together on one plane in contact with each other.

Figure 20:
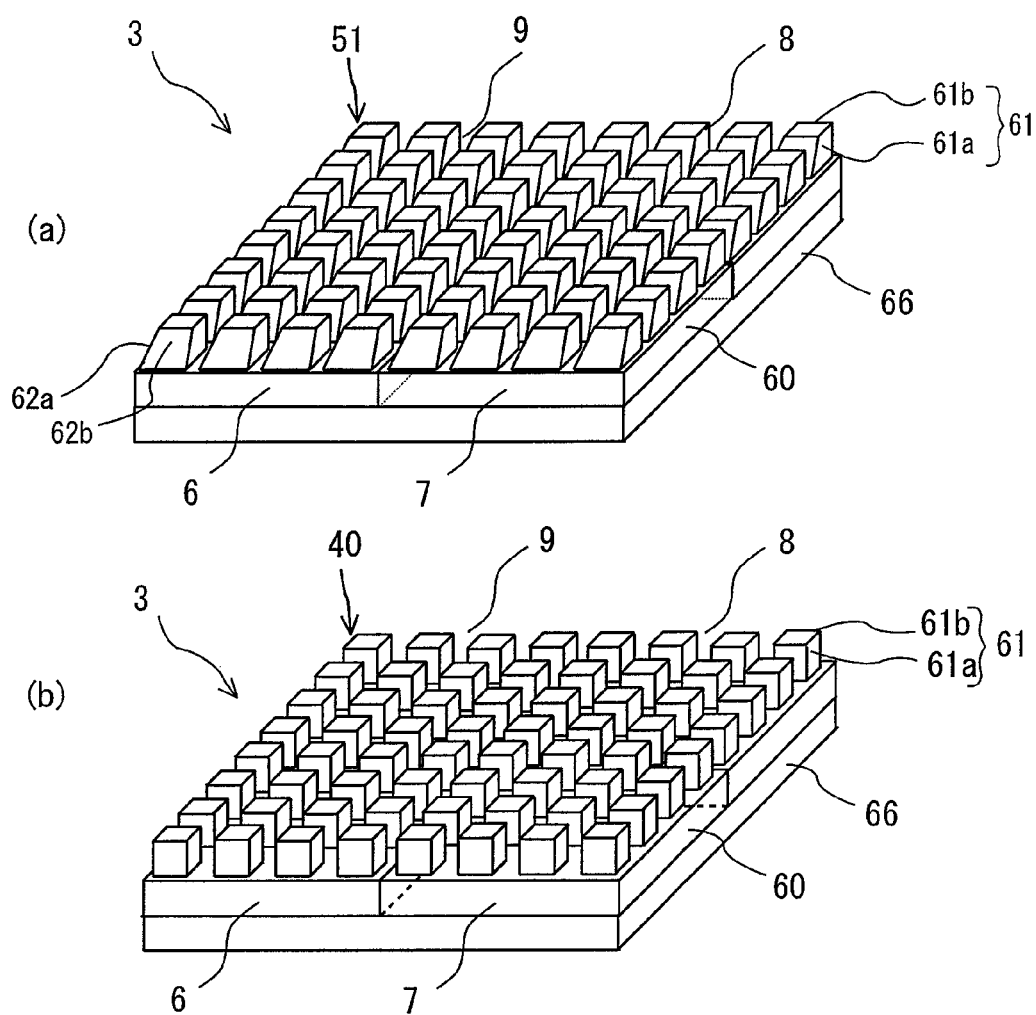
FIGS. 20($a$) and 20($b$) are schematic perspective views conceptually illustrating a reflector array optical device with four dihedral corner reflector array optical elements bonded together according to another embodiment of the present invention.

Furthermore, for example, as shown in FIG. 20, it is possible to form, in the same manner as the manufacturing method shown in FIG. 19, a reflector array optical device in which the same four dihedral corner reflector array optical elements 6, 7, 8, and 9 having a plurality of projections of truncated pyramids 51 are joined together, and which has the transparent flat plate 66 that is bonded to and stacked on the principal surfaces of the substrates 60 opposite to the dihedral corner reflectors 61. In this case, prepared is a transparent flat plate 66 which has a larger area than the total area of the same four rectangular dihedral corner reflector array optical elements 6, 7, 8, and 9. The elements are disposed so that the corners of the substrates of each of the elements are opposed to each other and the end faces thereof are opposed to each other. The elements are then bonded together so that the corners and the end faces are all butt-joined to the respective counterparts.

In the same manner, as shown in FIG. 20(b), the dihedral corner reflector array optical element 6 as shown in FIG. 3 can be used to obtain the reflector array optical device 3 in which the same dihedral corner reflector array optical elements 6, 7, 8, and 9 (four smaller panels) having a plurality of rectangular parallelepiped projections 40 are disposed side by side in contact with each other and joined together on one plane on the transparent flat plate 66.

Figure 21:
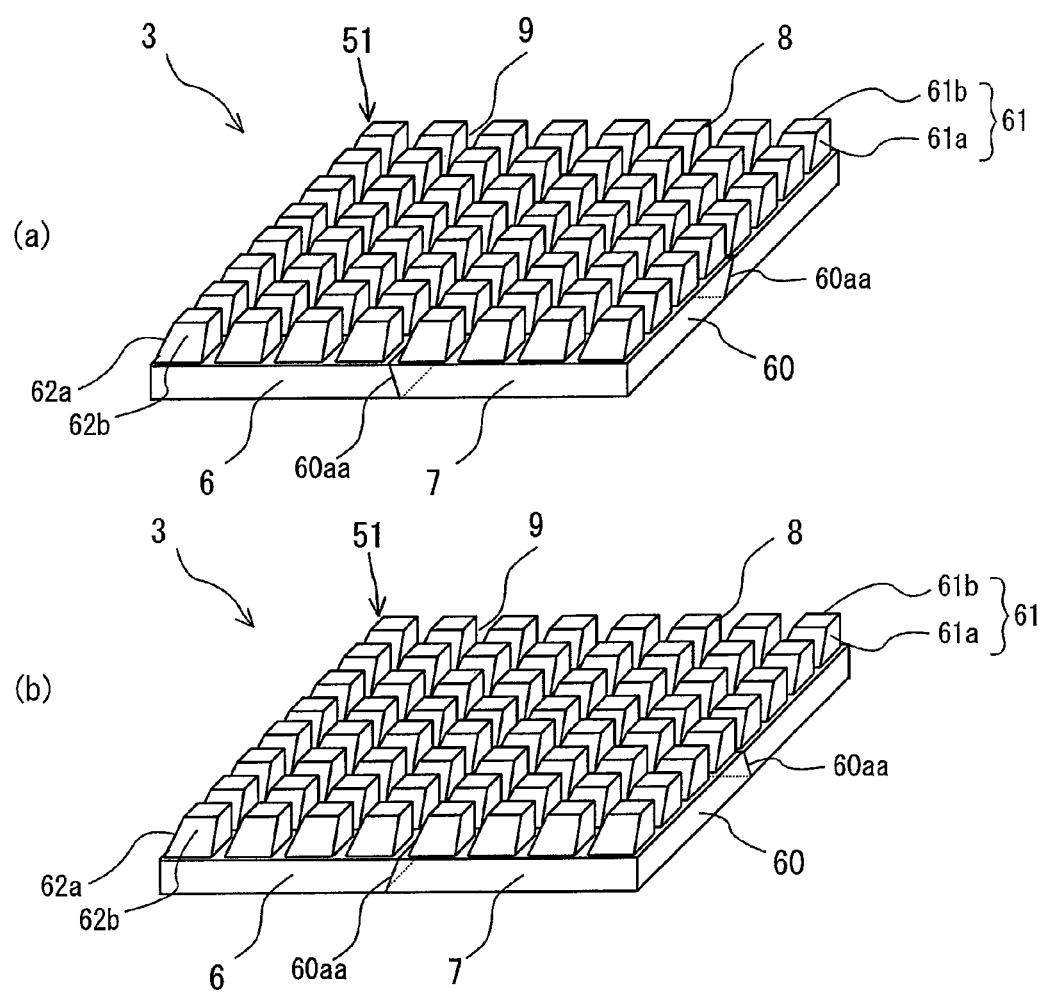
FIGS. 21($a$) and 21($b$) are schematic perspective views conceptually illustrating a reflector array optical device with four dihedral corner reflector array optical elements bonded together according to another embodiment of the present invention.

In the aforementioned embodiment, the end faces 60a for adhering the dihedral corner reflector array optical elements 6 to each other are formed as a planar surface perpendicular to the principal surface on which the dihedral corner reflectors are provided. However, the end faces are not limited thereto, but may also be a planar surface that is formed at an angle to the principal surface. FIGS. 21(a) and (b) show a reflector array optical device 3 which is the same as the one according to the embodiment shown in FIG. 17 (a) except that with an end face 60aa tilted complementarily relative to the principal surface on which the dihedral corner reflectors are provided, the dihedral corner reflector array optical elements are adhered to each other. The dihedral corner reflector array optical elements 6, 7, 8, and 9 are each provided in advance with the end faces 60aa as planar surfaces tilted at the same angle but oriented in the opposite direction, and then bonded together by any one of the aforementioned first to third manufacturing methods so that when being bonded together, the principal surfaces on which the dihedral corner reflector are provided are continuous. The dihedral corner reflector array optical elements 6 provided in this manner have a substrate end face that is bonded not perpendicularly but at an angle of inclination, thus making the seam unnoticeable. For example, this is particularly effective when only the substrate is as thick as 3 mm or greater.

Furthermore, when the substrates are as thick as 3 mm or greater in thickness for the type of which dihedral corner reflectors are provided by projections, it is also effective to polish and thereby reduce the thickness of the planar rear surface, after the substrates have been bonded together, in order to make the bonded end faces unnoticeable. Furthermore, since the polishing serves to remove the adhesive that was extruded from the section at the time of bonding, it is possible to eliminate the disturbance of an image due to the lens effect of the extruded adhesive.

According to the step of bonding using the adhesive tape 64, the flat plate 65, or the transparent flat plate 66 in the aforementioned first to third methods for manufacturing the reflector array optical device, the bonding can be performed in a positional relation in which the principal surfaces toward the projections and the principal surfaces opposite thereto of the substrates 60 of the dihedral corner reflector array optical elements 6 are aligned with the respective counterparts (without causing any step heights). When the adjacent substrates 60 have a step height on the principal surfaces, a distortion occurs in the real mirror image at the bonded portion. However, the aforementioned bonding step can prevent such a real mirror image distortion.

Figure 22:
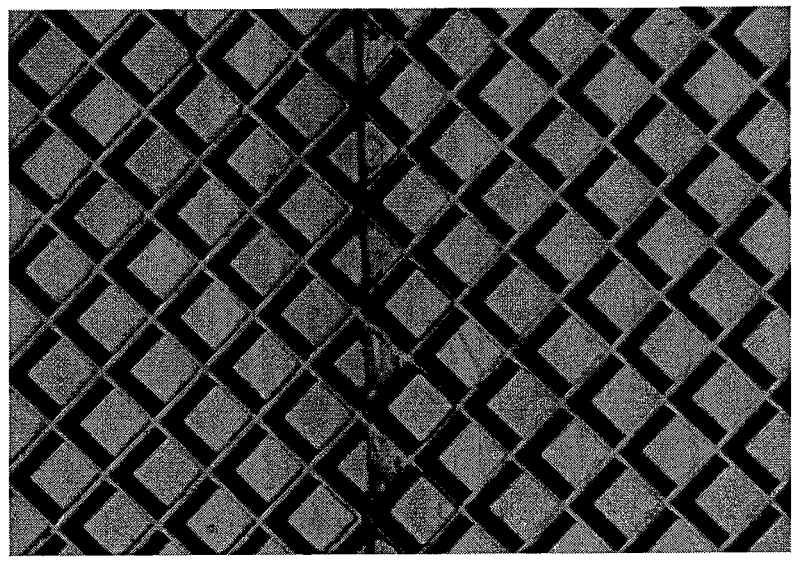
FIG. 22 is a photomicrograph showing part of a reflector array optical device according to an embodiment of the present invention.

FIG. 22 is a photomicrograph provided by a reflector array optical device actually manufactured according to an embodiment of the present invention. This picture was obtained by taking an image of part of the front of the reflector array optical device that is obtained by bonding together the two rectangular acrylic dihedral corner reflector array optical elements 6 having a flat end face 60a intersecting at an angle of 45 degrees the orthogonal side faces 61a and 61b shown in FIG. 14, the bonding being performed by the method according to the first embodiment described with reference to FIG. 16 so that the side faces of the dihedral corner reflectors are aligned with each other. This reflector array optical device achieved a large real mirror image forming optical system which allows a bright real image (real mirror image) of an object being observed to be formed in a space toward an observer.

[Fourth Method for Manufacturing a Reflector Array Optical Device]

Now, with reference to FIG. 23, a description will be made to a procedure for manufacturing a reflector array optical device by bonding together two dihedral corner reflector array optical elements 6. Note that FIG. 23 emphasizes and conceptually illustrates the 4×4 projections of truncated pyramids 51 of the dihedral corner reflector array optical elements 6 in order to indicate the orientation of the dihedral corner reflectors, and thus the number and the size thereof are not accurately shown.

Figure 23:
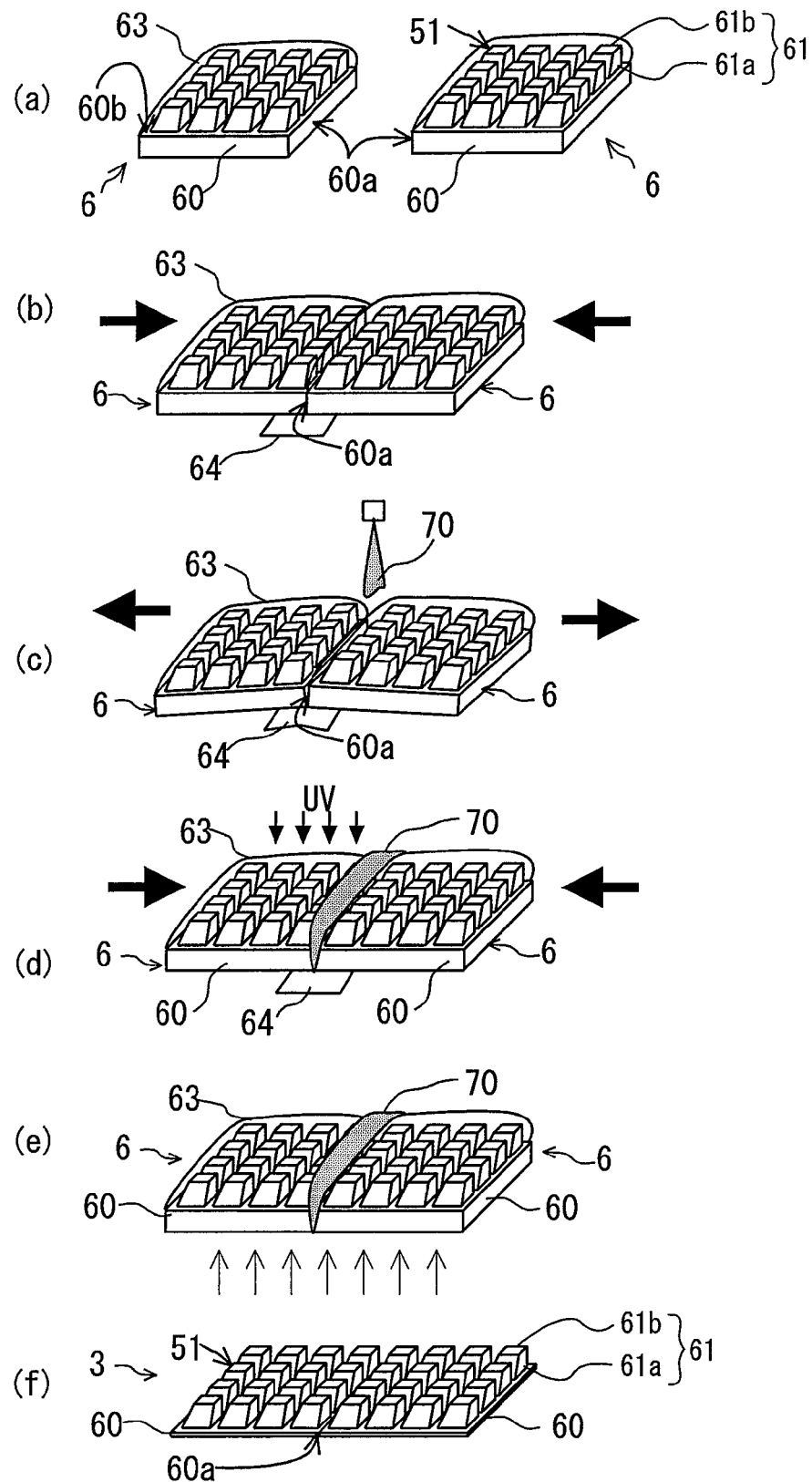
FIGS. 23($a$) to 23($f$) are schematic perspective views conceptually illustrating two dihedral corner reflector array optical elements in a method for manufacturing a reflector array optical device according to another embodiment of the present invention.

Next, as shown in FIG. 23 (a), the water-soluble masking material 63 is used to cover a plurality of projections of truncated pyramids 51 (the dihedral corner reflectors 61) on the principal surface 60b of the substrate 60 adjacent to the end face 60a of the substrate 60 of each of the two dihedral corner reflector array optical elements 6 to be adhered to each other.

The masking material 63 may be provided either to entirely cover the area on which the projections of truncated pyramids 51 of an optical element are placed or to cover only part of the vicinity of the end face 60a (e.g., about 2 cm from the vicinity of a substrate section). By taking the subsequent steps into account, the masking material 63 may also be formed to be as thick as about 5 mm to 10 mm. The adhesive caught to remain in the gaps between the projections of truncated pyramids 51 may cause a change in reflection conditions when a light beam propagating through the projections of truncated pyramids 51 in the manufactured reflector array optical device is reflected on the surface of the projections of truncated pyramids 51. The masking material 63 serves to prevent this.

There is a possibility that when an adhesive with vinyl acetate resin emulsified in water is used as the masking material 63, the adhesive may cause excessively high adhesiveness, so that the masking material itself having penetrated in between the projections of truncated pyramids 51 cannot be removed. In contrast, a rubber-based masking material having an excessively low adhesion may not provide a good covering effect, so that the rubber-based masking material may strip off the end of the substrate before the end faces 60a are adhered to each other. Furthermore, when being washed in ethanol or the like, the substrate and the projections of truncated pyramids which are made of an acrylic resin may be cracked because the acrylic resin has a low chemical resistance. In this context, this embodiment employs, as the masking material 63, a water-soluble chemical agent, GSI Creos Masking Sol (trade mark), which has a good adhesion to the substrate. This allows the masking material to be readily removed when the end faces 60a of the dihedral corner reflector array optical elements 6 are adhered to each other and then soaked in water for ultrasonic cleaning. The masking material 63 is a peelable film-forming paint which has a solvent resistance to an adhesive and insolubility to the dihedral corner reflector array optical element 6. Note that the adhesive has not necessarily to be an optical adhesive but may be any one so long as the adhesive has adhesion to the masking material 63.

Next, as shown in FIG. 23(b), the substrate end faces 60a of the two dihedral corner reflector array optical elements 6 to be adhered to each other are brought into contact, and then the adhesive tape 64 is affixed to and thereby couples between the principal surfaces (opposite to the principal surface 60b with the projections formed thereon) of the substrates 60 in such a positional relation as to bridge between the end faces 60a of the adhered substrates. Here, the two dihedral corner reflector array optical elements 6 are aligned and brought into contact with each other so that all the dihedral corner reflectors 61 of both the elements are perpendicular to the principal surfaces of the substrates 60 and the orientations of the interior angles of the orthogonal side faces 61a and 61b are aligned in a certain direction.

The adhesive tape 64 (e.g., Sellotape (trade mark)) is affixed to the planar surface of the substrate having no projections of truncated pyramids 51. It is very important for the adhesive tape 64 to cause no step heights in the direction of the thickness of the dihedral corner reflector array optical elements 6 (substrates) in order to make the seam unnoticeable. The adhesive tape 64 has to be affixed so as not to cause a wrinkle or catch a bubble under the adhesive tape 64. The adhesive tape 64 can prevent a liquid-state adhesive from penetrating to the planar surface of the substrate.

Next, as shown in FIG. 23 (c), with a coupled portion as a fulcrum (a rotational center), the coupled portion being provided by the adhesive tape 64 before the two dihedral corner reflector array optical elements 6 are bonded together, the end faces 60a of the adjacent substrates are opened, and then a liquid-state optical adhesive 70 is supplied into between the end faces 60a. Here, the surface on which the projections of truncated pyramids 51 are formed, the surface being opposite to the surface to which the adhesive tape 64 is affixed, is opened in a V shape, and then a certain amount of the liquid-state optical adhesive 70 is dispensed thereto several times through a tapered nozzle or the like. The optical adhesive 70 to be employed may be, for example, a UV curable resin that has a refractive index generally equal to the refractive index of the resin, such as acrylic, which forms the substrate 60. This allows for ensuring the amount of light that passes through the adhesive layer after the bonding, and preventing reflection of light on the boundary of the adhesive layer, thereby making the seam unnoticeable.

As shown in FIG. 23(d), while part of the optical adhesive 70 is being extruded from the surface of the masking material 63 through the gaps between the end faces 60a of the substrates and between the masking materials 63, the end faces of the substrates of the two dihedral corner reflector array optical elements 6 are closed and bonded together. Here, by being retained in advance with the adhesive tape 64, the bonding can be performed in a positional relation in which the principal surfaces toward the projections and the principal surfaces opposite thereto of the substrates 60 of the dihedral corner reflector array optical elements 6 being bonded together are aligned with the respective counterparts without causing any step heights. The two dihedral corner reflector array optical elements 6 are forcibly pushed from both the sides against each other and then while being held in this state, irradiated with ultraviolet radiation so as to harden the optical adhesive 70. Although an unwanted amount of the optical adhesive 70 is extruded from the side of the projections of truncated pyramids 51 of the substrates 60, there will arise no problem because the masking material 63 protects the projections of truncated pyramids 51.

Next, the adhesive tape 64 is peeled off from the dihedral corner reflector array optical elements 6 that are bonded together, and subsequently, in a grinding step, the principal surface (planar surface) opposite to the principal surface having the projections of the substrate 60 is polished, thereby reducing the thickness of the substrate 60 than at the time of the bonding (FIG. 23 (e)). In the grinding step, it is possible to employ a typical polishing technique or cutting technique which combines the rotation of the substrate 60 around itself and around other than itself using an abrasive agent. Since the grinding step allows for removing the extrusion or an unfilled portion of the optical adhesive 70, it is possible to manufacture a large-area reflector array optical device in which a seam at least on one surface of the substrate 60 is unnoticeable.

Next, the masking material 63 is removed from the principal surface of the substrate 60 in conjunction with part of the optical adhesive 70 (FIG. 23 (f)). This allows for obtaining a reflector array optical device 3 in which the same two dihedral corner reflector array optical elements having a plurality of projections of truncated pyramids 51 with the orientations of the interior angles of the orthogonal side faces 61a and 61b aligned in a certain direction are disposed side by side and joined together on one plane in contact with each other. Note that the step of removing the masking material and the grinding step may be followed in reverse order, that is, the masking material 63 may also be peeled off after the substrates 60 have been polished.

The bonding using the masking material as described above makes it possible to minimize the extrusion of the optical adhesive from the projection side or the adhesive tape side. On the other hand, as a result of experiments, such problems were found that a trace amount of the optical adhesive 70 was extruded into a slight gap under the masking material 63 or under the adhesive tape 64, or conversely, the optical adhesive was not sufficiently penetrated and thus caused a bubble to be left thereunder. It was found that these causes made the seam easily noticeable. This embodiment is intended to remove the substrate 60 by a grinding method such as polishing or cutting in the grinding step, thereby eliminating these causes. When the substrates are as thick as 3 mm or greater in thickness for the type of which dihedral corner reflectors are provided by projections, it is effective to polish and thereby reduce the thickness of the planar rear surface, after the substrates have been bonded together, in order to make the bonded end faces unnoticeable. Furthermore, since the polishing serves to remove the adhesive that was extruded from the section at the time of bonding, it is possible to eliminate the disturbance of an image due to the lens effect of the extruded adhesive.

Furthermore, as shown in FIG. 23(d), a slightly greater amount of the optical adhesive 70 than required for bonding may be employed, thereby raising the optical adhesive 70 from the masking material 63 when the two dihedral corner reflector array optical elements 6 are pushed against each other from both the sides. This allows the optical adhesive 70 with the masking material 63 melted and hardened during ultrasonic cleaning to be slightly floated, so that an excess hardened optical adhesive 70 is easily peeled off and the optical adhesive is filled only in between the end faces of the substrates. In this manner, the portion to which the optical adhesive 70 is adhered is advantageously raised from the masking material when an unwanted amount of adhesive is peeled off. Furthermore, since excess hardened adhesive resin is removed, degradation in the sharpness of the real mirror image due to the lens effect of the excess hardened adhesive resin can be advantageously prevented. It was also found that the faces to be adhered to each other of the dihedral corner reflector array optical elements 6 should be best polished to have as flat a mirror surface as possible. With the end faces 60a having bumps and dips, even use of an ultraviolet curable adhesive having a matched refractive index may not provide a clear view due to a white turbidity on the adhered section.

Figure 24:
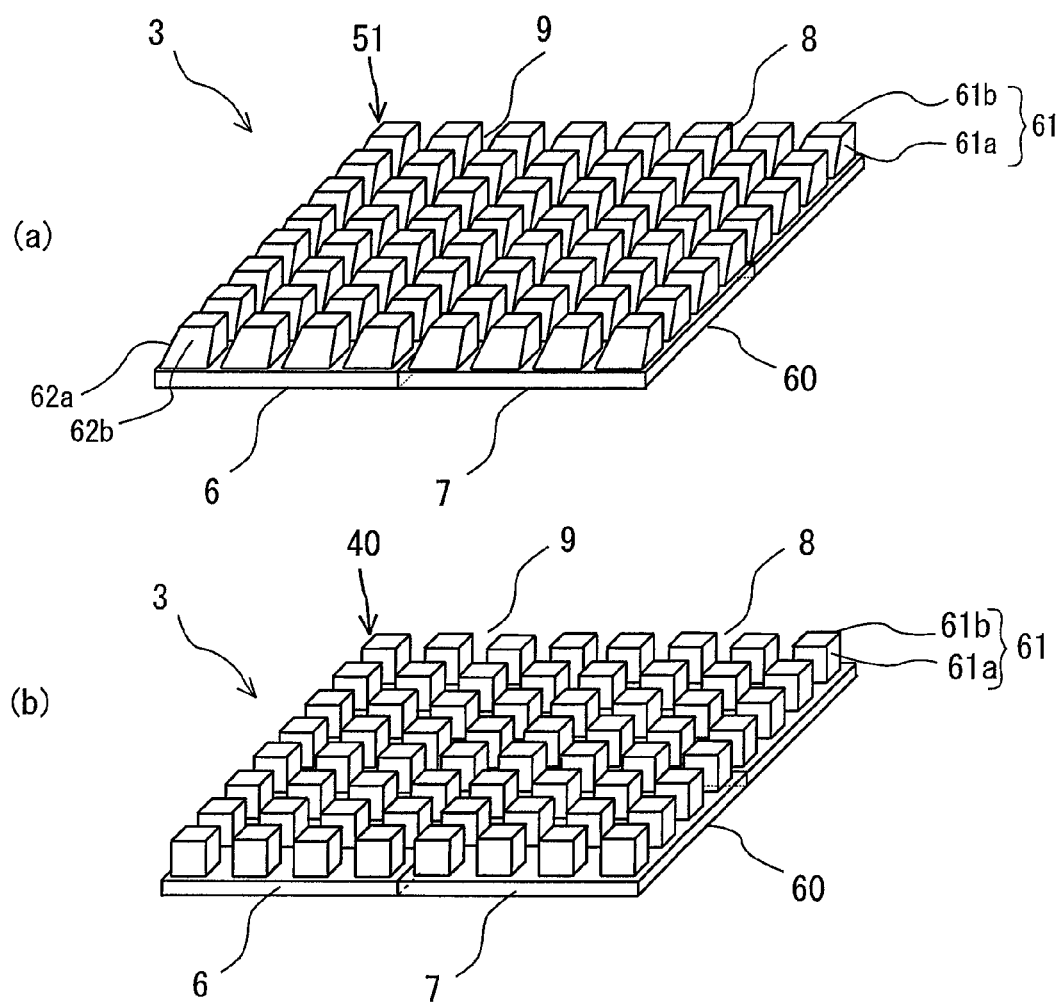
FIGS. 24($a$) and 24($b$) are schematic perspective views conceptually illustrating a reflector array optical device with four dihedral corner reflector array optical elements bonded together according to another embodiment of the present invention.

The steps shown in shown in FIG. 23 are repeated to manufacture a plurality of sets of the dihedral corner reflector array optical elements 6 that have been bonded together, and by repeating the steps shown in FIG. 23 on two bonded sets, obtained as shown in FIG. 24(a) is the reflector array optical device 3 in which the same dihedral corner reflector array optical elements 6, 7, 8, and 9 (four smaller panels) having a plurality of projections of truncated pyramids 51 are disposed side by side and joined together on one plane in contact with each other with no gap therebetween. Note that the grinding step shown in FIG. 23(e) could also be followed not at the time of bonding the two dihedral corner reflector array optical elements together but at the time of bonding together a plurality of elements as shown in FIG. 24(a) with the masking material left.

When the dihedral corner reflector array optical element 6 is used as shown in FIG. 3, the steps shown in FIG. 23 are repeated to manufacture a plurality of sets of the dihedral corner reflector array optical elements 6 that have been bonded together, and by repeating the steps shown in FIG. 23 on two bonded sets, obtained as shown in FIG. 24(b) is the reflector array optical device 3 in which the same dihedral corner reflector array optical elements 6, 7, 8, and 9 (four smaller panels) having a plurality of rectangular parallelepiped projections 40 are disposed side by side and joined together on one plane in contact with each other.

[Fifth Method for Manufacturing a Reflector Array Optical Device]

Figure 25:
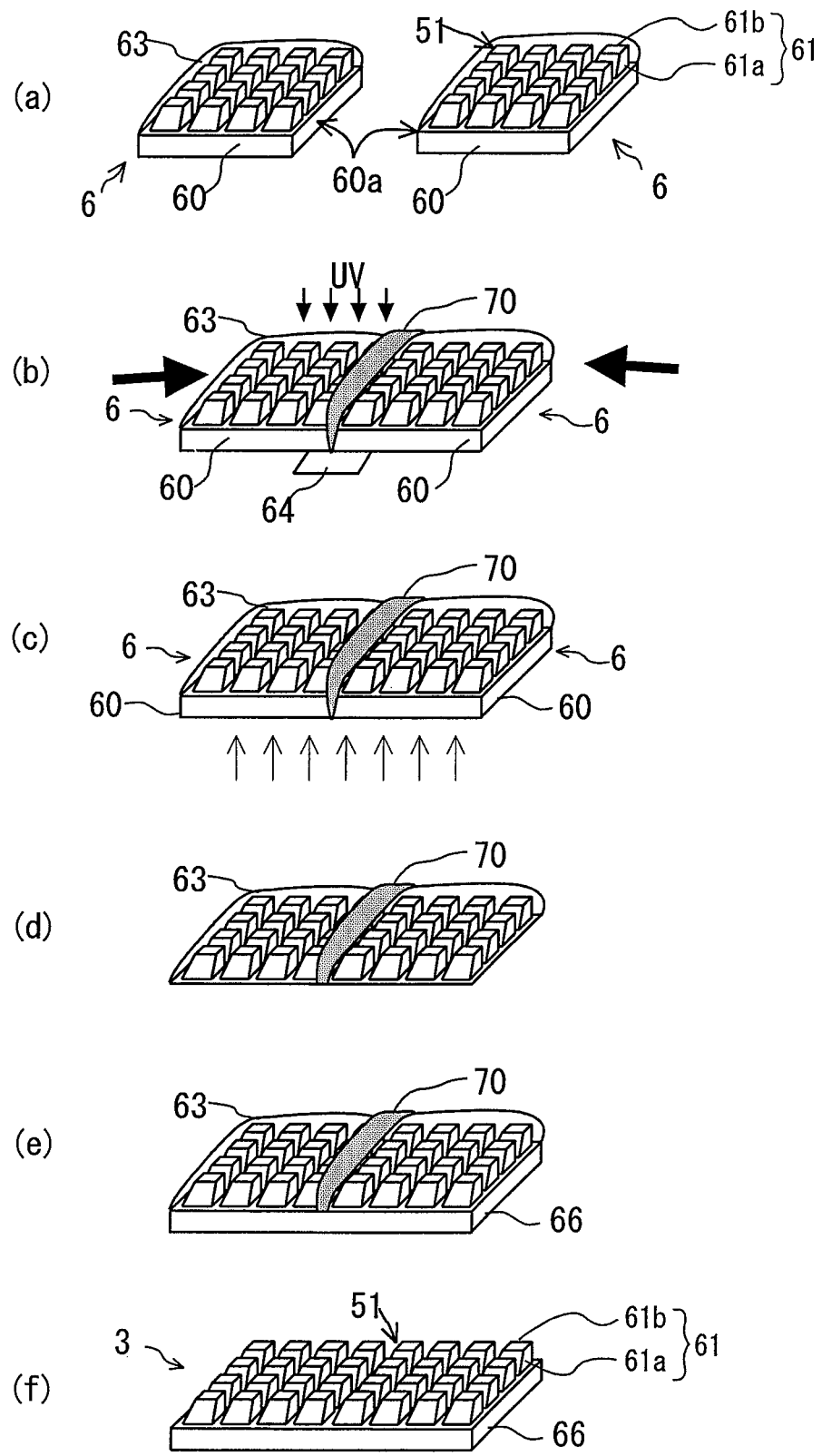
FIGS. 25($a$) to 25($f$) are schematic perspective views conceptually illustrating two dihedral corner reflector array optical elements in a method for manufacturing a reflector array optical device according to another embodiment of the present invention.

First, as shown in FIG. 25(*a*), the water-soluble masking material 63 is used to cover all of a plurality of projections of truncated pyramids 51 (the dihedral corner reflectors 61) on the principal surface of the substrate 60 adjacent to the end face 60*a* of the substrate 60 of each of the two dihedral corner reflector array optical elements 6 to be adhered to each other. The masking material 63 is provided to entirely cover the area on which the projections of truncated pyramids 51 of the optical element are placed, and by taking the subsequent steps into account, the masking material 63 is formed to be as thick as about 5 mm to 10 mm. The masking material 63 serves as an auxiliary substrate for supporting the plurality of projections 51.

Next, as shown in FIG. 25 (*b*), the dihedral corner reflector array optical elements are bonded together with the adhesive 70. At the time of the bonding, the adhesive tape 64 according to the first manufacturing method may be employed. Note that the adhesive 70 to be employed may be an adhesive other than the optical adhesive, or any one that has adhesion to the masking material 63.

Subsequently, as shown in FIG. 25 (*c*), the principal surface (planar surface) opposite to the principal surface having the projections of the substrates 60 is polished. The polishing serves to remove the substrates as shown in FIG. 25(*d*). That is, part of each of the plurality of dihedral corner reflectors (the bottom surface of the projections) and the masking material 63 are exposed.

Prepared in advance is another transparent substrate 66 or a transparent flat plate which has the same area as or an area greater than that of the plurality of dihedral corner reflector array optical elements that have been bonded together.

Next, as shown in FIG. 25(*e*), the plurality of dihedral corner reflectors (projections) are rearranged on the transparent substrate 66 with an optical adhesive (not illustrated). That is, in the grinding step, the substrates are removed by being ground to be zero in thickness, and then the exposed surface of part of each of the dihedral corner reflectors and the masking material after the grinding step are adhered to the principal surface of the transparent substrate 66 with an optical adhesive (not illustrated). Note that the principal surface of the transparent substrate 66 is preferably a mirror-finished surface. The optical adhesive to be employed is, for example, a UV curable resin that has a refractive index generally equal to that of a resin such as acrylic of which the transparent substrate 66 is made.

Finally, as shown in FIG. 25(*f*), the masking material 63 is removed in conjunction with the optical adhesive 70 as in the first manufacturing method. This allows for obtaining the reflector array optical device 3 which has the transparent substrate 66 and a plurality of dihedral corner reflectors adhered thereon (a plurality of projections of truncated pyramids 51 with the orientations of the interior angles of the orthogonal side faces 61*a* and 61*b* aligned in a certain direction). Although part of the masking material 63 may possibly remain on the transparent substrate 66 because the optical adhesive is also used in the step of bonding to the transparent substrate 66, a light beam passing through this part has nothing to do with image-forming and thus causes no problem.

As is illustrated in this embodiment, if the substrates 60 that have been bonded together are completely removed, the problem with the seam is eliminated, thereby making it possible to prove a high-performance large reflector array optical device.

Figure 26:
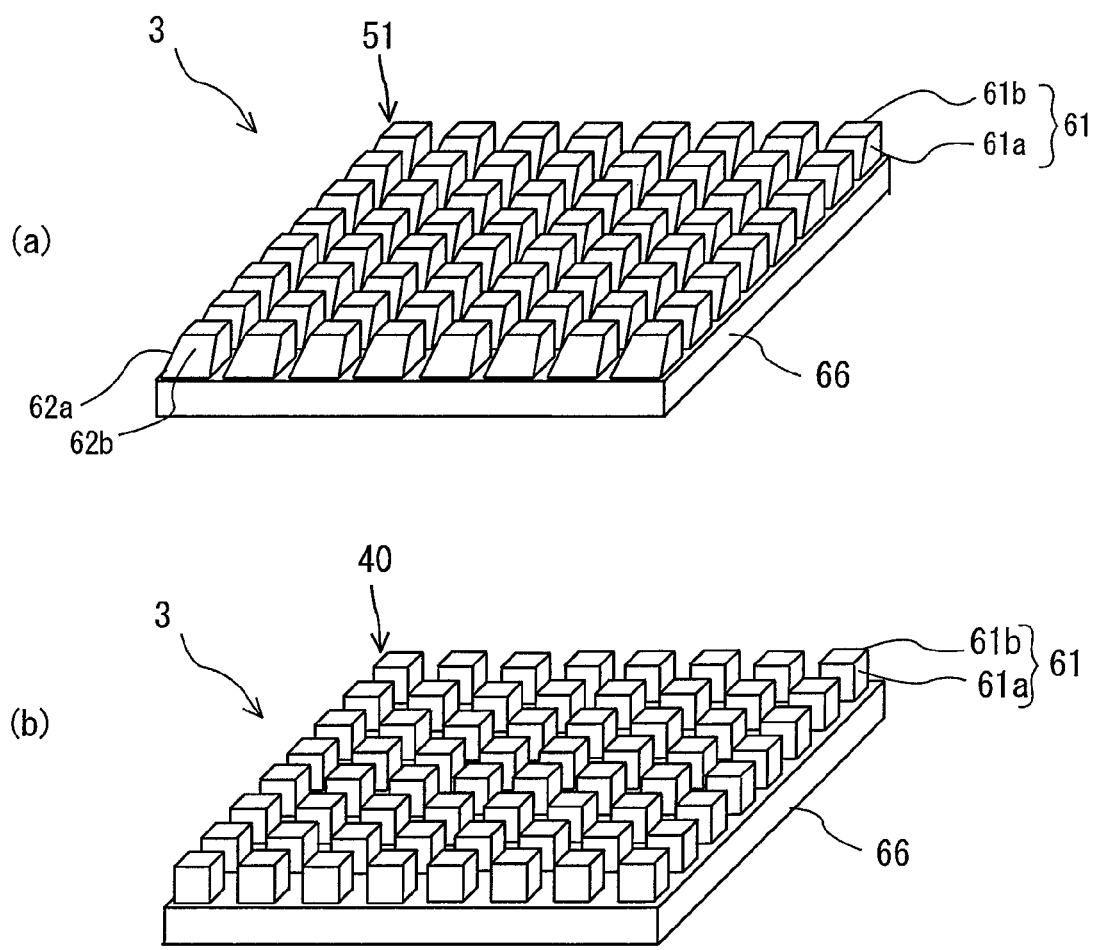
FIGS. 26($a$) and 26($b$) are schematic perspective views conceptually illustrating a reflector array optical device according to another embodiment of the present invention.

For example, as shown in FIG. 26(*a*), it is possible to manufacture a reflector array optical device 3 that has the transparent substrate 66 with a plurality of projections of truncated pyramids 51 (the dihedral corner reflectors 61). In this case, the reflector array optical device 3 can be manufactured in a manner such that prepared is a transparent substrate 66 having an area that is greater than the total area of the same four rectangular dihedral corner reflector array optical elements (not illustrated); with the masking material left on the plurality of projections of truncated pyramids, the same four dihedral corner reflector array optical elements are brought into contact with each other, and the principal surface of the substrate opposite to the dihedral corner reflectors is ground and thereby removed; and the bottom surface of the plurality of exposed projections of truncated pyramids is adhered to the transparent substrate 66 with an optical adhesive.

In the same manner, using the dihedral corner reflector array optical element 6 as shown in FIG. 3, it is possible to manufacture a reflector array optical device 3 having the transparent substrate 66 with a plurality of projections of truncated pyramids 51 (the dihedral corner reflectors 61) as shown in FIG. 26(*b*).

REFERENCE SIGNS LIST

6 Dihedral corner reflector array optical element
6S Element plane
40 Rectangular parallelepiped projection
51 Projection of truncated pyramid
52 Bottom surface
53 Top surface
60 Substrate
61 Dihedral corner reflector
61*a*, 61*b* Orthogonal side faces (mirror surfaces)
62*a*, 62*b* Side faces other than dihedral corner reflector (tapered surface)
63 Masking material
64 Adhesive tape
65 Planar flat plate
66 Transparent flat plate
70 Adhesive
CL Line of intersection of mirror surfaces
C Cubic portion
T Tapered portion

The invention claimed is:

1. A method for manufacturing a reflector array optical device, the optical device allowing a real image of an object being observed that is disposed toward one side of a principal plane to be formed in a space toward the other side of the principal plane, the method comprising:

a step of forming at least two dihedral corner reflector array optical elements, the dihedral corner reflector array optical element including a substrate and a plurality of dihedral corner reflectors which each have at least two orthogonal side faces, the orthogonal side faces being perpendicular to a principal surface of the substrate and orthogonal to each other, and being integrated with the substrate so that orientations of interior angles of the orthogonal side faces are aligned with each other;

a step of covering, with a masking material, the plurality of dihedral corner reflectors on the principal surface of the substrate adjacent to an end face of the substrate of each of the two dihedral corner reflector array optical elements, which are to be adhered to each other;

a step of bonding together the two dihedral corner reflector array optical elements while an adhesive is being supplied between the end faces of the substrates to be adhered to each other so as to extrude part of the adhesive between the end faces of the substrates from a surface of the masking material; and a step of removing the masking material from the plurality of dihedral corner reflectors on the principal surfaces of the substrates in conjunction with part of the adhesive.

2. The manufacturing method according to claim 1, wherein the step of bonding includes a step of bringing the end faces of the substrates to be adhered to each other of the two dihedral corner reflector array optical elements into contact with each other before supplying the adhesive between the end faces of the substrates, and affixing an adhesive tape to and thereby couple between the principal surfaces of the substrates in such a positional relation as to bridge between the end faces of the adhered substrates; and wherein with a coupled portion as a fulcrum, the coupled portion being provided by the adhesive tape before the two dihedral corner reflector array optical elements are bonded together, the end faces of the adjacent substrates are opened, and after the adhesive is supplied between the end faces, the end faces of the substrates are closed and thereby bonded together.

3. The manufacturing method according to claim 1, wherein in the bonding step, before the adhesive is supplied between the end faces of the substrates, the two dihedral corner reflector array optical elements are disposed on slider plates on a same plane of a flat plate so that the end faces of the substrates thereof to be adhered to each other are opposed to each other, and after the adhesive is supplied between the end faces of the substrates to be adhered to each other, the end faces of the substrates are pushed against each other and bonded together.

4. The manufacturing method according to claim 1, wherein in the bonding step, the adhesive is supplied onto a same plane of a transparent flat plate, and the two dihedral corner reflector array optical elements are disposed on the transparent flat plate, to which the adhesive has been supplied, so that the end faces of the substrates thereof to be adhered to each other are opposed to each other, and the adhesive is supplied between the end faces of the substrates to be adhered to each other, and the end faces of the substrates are pushed against each other so as to bond together the transparent flat plate and the two dihedral corner reflector array optical elements.

5. The manufacturing method according to claim 1, wherein the masking material includes a water-soluble masking material.

6. The manufacturing method according to claim 5, wherein in the step of removing the masking material, ultrasonic cleaning is performed in water.

7. The manufacturing method according to claim 1, further comprising:

after the step of bonding the two dihedral corner reflector array optical elements and before the step of removing the masking material, a grinding step of grinding a principal surface opposite to the principal surface of the substrate having the plurality of dihedral corner reflectors formed therein to form a mirror surface and reduce the thickness of the substrate to be less than that at the time of the bonding.

8. The manufacturing method according to claim 1, wherein:

in the step of covering with the masking material the plurality of dihedral corner reflectors on the principal surface of the substrate, all of the plurality of dihedral corner reflectors are covered with the masking material;

the method further comprises, after the step of bonding the two dihedral corner reflector array optical elements and before the step of removing the masking material, a grinding step of grinding a principal surface opposite to the principal surface of the substrate having the plurality of dihedral corner reflectors formed therein to grind the substrates to zero in thickness so as to remove the substrates and expose parts of the plurality of dihedral corner reflectors and the masking material;

after the grinding step, the method further comprises a step for adhering a transparent substrate to exposed surfaces of the parts of the plurality of dihedral corner reflectors and the masking material.

9. A reflector array optical device manufactured by the manufacturing method according to claim 8, comprising the transparent substrate and the plurality of dihedral corner reflectors adhered to the transparent substrate, wherein each of the plurality of dihedral corner reflectors is a projection having at least two orthogonal side faces, the orthogonal side faces being perpendicular to a principal surface of the transparent substrate and orthogonal to each other, and a top surface parallel to the principal surface of the transparent substrate, and adhered to the transparent substrate such that orientations of interior angles of the orthogonal side faces are aligned with each other and a line of intersection of the orthogonal side faces is parallel to a normal to the transparent substrate.

\* \* \* \* \*